US010139996B2

(12) United States Patent
Karam

(10) Patent No.: US 10,139,996 B2
(45) Date of Patent: *Nov. 27, 2018

(54) METHOD, SYSTEM, AND GRAPHICAL USER INTERFACE FOR MEETING-SPOT-RELATED CONTACT LISTS

(71) Applicant: GOOGLE LLC, Mountain View, CA (US)

(72) Inventor: Joseph F Karam, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/305,421

(22) Filed: Jun. 16, 2014

(65) Prior Publication Data

US 2014/0297712 A1 Oct. 2, 2014

Related U.S. Application Data

(63) Continuation of application No. 11/759,848, filed on Jun. 7, 2007, now Pat. No. 8,756,501, which is a
(Continued)

(51) Int. Cl.
*G06F 3/0484* (2013.01)
*G06Q 10/10* (2012.01)
(Continued)

(52) U.S. Cl.
CPC ...... *G06F 3/04842* (2013.01); *G06F 3/04817* (2013.01); *G06Q 10/107* (2013.01); *H04L 51/32* (2013.01)

(58) Field of Classification Search
CPC .... G06F 3/0482; G06F 3/0481; G06F 3/0483; G06F 3/04817; H04N 5/44543
See application file for complete search history.

(56) References Cited

U.S. PATENT DOCUMENTS 5,818,450 A 10/1998 Katsuta
5,883,626 A 3/1999 Glaser et al.
(Continued)

FOREIGN PATENT DOCUMENTS

WO WO 02/01405 1/2002
WO WO 2005/006145 1/2005
(Continued)

OTHER PUBLICATIONS

Amazon.com Yellow Page (sample page), Dec. 23, 2005, 3 pgs.
(Continued)

*Primary Examiner* — Kevin L Young
*Assistant Examiner* — Erik V Stitt
(74) *Attorney, Agent, or Firm* — Morgan, Lewis & Bockius LLP

(57) ABSTRACT

One aspect of the invention involves a computer-implemented method in which a client device associated with a first user: receives from a server computer information about a plurality of other users associated with a meeting spot; displays an identifier for the meeting spot and at least some of the information for the plurality of other users; receives from the first user a selection of information that corresponds to a second user associated with the meeting spot; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

20 Claims, 26 Drawing Sheets

Related U.S. Application Data continuation-in-part of application No. 11/522,548, filed on Sep. 13, 2006, now Pat. No. 7,797,642, which is a continuation-in-part of application No. 11/323,142, filed on Dec. 30, 2005, now Pat. No. 7,917,866.

(51) Int. Cl.
*H04L 12/58* (2006.01)
*G06F 3/0481* (2013.01)

(56) References Cited

U.S. PATENT DOCUMENTS

| | | |
|---|---|---|
| 5,974,446 A | 10/1999 | Sonnenreich et al. |
| 6,202,212 B1 | 3/2001 | Sturgeon et al. |
| 6,366,962 B1 | 4/2002 | Teibel |
| 6,424,910 B1 | 7/2002 | Ohler et al. |
| 6,480,885 B1 * | 11/2002 | Olivier ............... H04L 12/1859 709/202 |
| 6,507,726 B1 | 1/2003 | Atkinson et al. |
| 6,577,714 B1 | 6/2003 | Darcie et al. |
| 6,677,968 B1 | 1/2004 | Appelman |
| 6,681,108 B1 | 1/2004 | Terry et al. |
| 6,690,918 B2 | 2/2004 | Evans et al. |
| 6,714,791 B2 | 3/2004 | Freidman |
| 6,732,120 B1 | 5/2004 | Du |
| 6,745,178 B1 | 6/2004 | Emens et al. |
| 6,771,970 B1 | 8/2004 | Dan |
| 6,829,532 B2 | 12/2004 | Obradovich et al. |
| 6,968,179 B1 | 11/2005 | De Vries |
| 6,981,021 B2 | 12/2005 | Takakura et al. |
| 7,069,308 B2 | 6/2006 | Abrams |
| 7,082,365 B2 | 7/2006 | Sheha et al. |
| 7,117,254 B2 | 10/2006 | Lunt et al. |
| 7,136,915 B2 | 11/2006 | Rieger, III |
| 7,188,153 B2 | 3/2007 | Lunt et al. |
| 7,200,638 B2 | 4/2007 | Lake |
| 7,202,814 B2 | 4/2007 | Caspi et al. |
| 7,222,187 B2 | 5/2007 | Yeager et al. |
| 7,234,117 B2 | 6/2007 | Zaner |
| 7,236,799 B2 | 6/2007 | Wilson et al. |
| 7,243,075 B1 | 7/2007 | Shaffer et al. |
| 7,310,676 B2 | 12/2007 | Bourne |
| 7,340,057 B2 | 3/2008 | Martin, Jr. et al. |
| 7,342,587 B2 | 3/2008 | Danzig et al. |
| 7,373,244 B2 | 5/2008 | Kreft |
| 7,401,098 B2 | 7/2008 | Baker |
| 7,468,729 B1 | 12/2008 | Levinson |
| 7,472,352 B2 | 12/2008 | Liversidge et al. |
| 7,568,007 B2 | 7/2009 | Narayanaswami et al. |
| 7,603,413 B1 | 10/2009 | Herold et al. |
| 7,606,580 B2 | 10/2009 | Granito et al. |
| 7,702,728 B2 | 4/2010 | Zaner et al. |
| 7,765,265 B1 | 7/2010 | Granito et al. |
| 7,819,749 B1 * | 10/2010 | Fish ...................... A63F 13/12 463/42 |
| 7,970,912 B2 * | 6/2011 | Bourne ................. H04L 51/32 455/414.1 |
| 8,122,137 B2 | 2/2012 | Appelman et al. |
| 8,230,036 B2 | 7/2012 | Ishikawa et al. |
| 2001/0048449 A1 | 12/2001 | Baker |
| 2002/0007396 A1 | 1/2002 | Takakura et al. |
| 2002/0013738 A1 | 1/2002 | Vistisen |
| 2002/0055926 A1 | 5/2002 | Dan et al. |
| 2002/0103892 A1 | 8/2002 | Rieger, III |
| 2002/0116458 A1 | 8/2002 | Bricklin et al. |
| 2002/0130904 A1 | 9/2002 | Becker et al. |
| 2003/0037110 A1 | 2/2003 | Yamamoto |
| 2003/0055983 A1 | 3/2003 | Callegari |
| 2003/0078981 A1 | 4/2003 | Harms |
| 2003/0079024 A1 | 4/2003 | Hough et al. |
| 2003/0135493 A1 | 7/2003 | Phelan et al. |
| 2003/0154250 A1 | 8/2003 | Miyashita |
| 2003/0210265 A1 | 11/2003 | Haimberg |
| 2003/0222902 A1 | 12/2003 | Chupin et al. |
| 2003/0233537 A1 | 12/2003 | Wohlgemuth et al. |
| 2004/0041836 A1 | 3/2004 | Zaner et al. |
| 2004/0042599 A1 | 3/2004 | Zaner et al. |
| 2004/0054572 A1 | 3/2004 | Oldale et al. |
| 2004/0056901 A1 | 3/2004 | March et al. |
| 2004/0122810 A1 | 6/2004 | Mayer |
| 2004/0148351 A1 | 7/2004 | Cotte |
| 2004/0152477 A1 | 8/2004 | Wu et al. |
| 2004/0162830 A1 | 8/2004 | Shirwadkar et al. |
| 2004/0172455 A1 | 9/2004 | Green et al. |
| 2004/0179039 A1 | 9/2004 | Blattner et al. |
| 2004/0189701 A1 | 9/2004 | Badt, Jr. |
| 2004/0203746 A1 | 10/2004 | Knauerhase et al. |
| 2004/0210844 A1 | 10/2004 | Pettinati et al. |
| 2004/0221224 A1 | 11/2004 | Blattner et al. |
| 2004/0243941 A1 | 12/2004 | Fish |
| 2005/0065995 A1 | 3/2005 | Milstein et al. |
| 2005/0086211 A1 | 4/2005 | Mayer |
| 2005/0130634 A1 | 6/2005 | Godfrey |
| 2005/0154639 A1 | 7/2005 | Zetmeir |
| 2005/0165715 A1 | 7/2005 | Farnham et al. |
| 2005/0172001 A1 | 8/2005 | Zaner et al. |
| 2005/0174975 A1 | 8/2005 | Mgrdechian et al. |
| 2005/0177385 A1 | 8/2005 | Hull et al. |
| 2005/0193054 A1 | 9/2005 | Wilson et al. |
| 2005/0197846 A1 | 9/2005 | Pezaris et al. |
| 2005/0198031 A1 | 9/2005 | Pezaris et al. |
| 2005/0210102 A1 | 9/2005 | Johnson et al. |
| 2005/0210409 A1 | 9/2005 | Jou |
| 2005/0228853 A1 | 10/2005 | Yamamura et al. |
| 2005/0246866 A1 | 11/2005 | Dalsing et al. |
| 2005/0246886 A1 | 11/2005 | Morel |
| 2005/0250552 A1 | 11/2005 | Eagle et al. |
| 2005/0256866 A1 | 11/2005 | Lu et al. |
| 2005/0283308 A1 | 12/2005 | Szabo et al. |
| 2006/0031772 A1 | 2/2006 | Valeski |
| 2006/0063539 A1 | 3/2006 | Beyer, Jr. |
| 2006/0085259 A1 | 4/2006 | Nicholas |
| 2006/0085373 A1 | 4/2006 | Dhillion et al. |
| 2006/0174207 A1 | 8/2006 | Deshpande |
| 2006/0184886 A1 | 8/2006 | Chung et al. |
| 2006/0190536 A1 | 8/2006 | Strong et al. |
| 2006/0235873 A1 | 10/2006 | Thomas |
| 2006/0241859 A1 | 10/2006 | Kimchi et al. |
| 2006/0266830 A1 | 11/2006 | Horozov et al. |
| 2006/0287878 A1 | 12/2006 | Wadhwa et al. |
| 2006/0294134 A1 | 12/2006 | Berkhim et al. |
| 2007/0067098 A1 | 3/2007 | Zelentsov |
| 2007/0112735 A1 | 5/2007 | Holloway et al. |
| 2007/0118809 A1 | 5/2007 | Ozugur et al. |
| 2007/0150444 A1 | 6/2007 | Chesnais et al. |
| 2007/0162862 A1 | 7/2007 | Ogasawara et al. |
| 2007/0208747 A1 | 9/2007 | Puckrin |
| 2009/0094048 A1 * | 4/2009 | Wallace ................. G06Q 50/01 705/319 |
| 2009/0213001 A1 * | 8/2009 | Appelman ............ H04L 12/581 342/357.59 |
| 2012/0203846 A1 | 8/2012 | Hull et al. |
| 2013/0212180 A1 | 8/2013 | Work et al. |

FOREIGN PATENT DOCUMENTS

| | | |
|---|---|---|
| WO | WO 2005/074443 | 8/2005 |
| WO | WO 2005/077068 | 8/2005 |

OTHER PUBLICATIONS

Apple.com, iChat AV Videoconferencing for the Rest of Us, Oct. 25, 2005, 2 pgs.

Application for Today's Mobile Lifestyle, Community Messaging Center, HP, Oct. 2003, 2 pgs.

Balkin, New Cell Phone Services Can Help Manage Your Social Life, NY Times, Apr. 6, 2005, 1 pg.

Barnett, Wayback Machine (Archive.org) Alex Barnet Blog Website, Oct. 26, 2005, 5 pgs.

Bleecker, Location-based Mobile Media: Maps, Games & Stories, EITO, 2002, 17 pgs.

Burak, Analyzing Usage of Location Based Services, Apr. 5-10, 2003, 2 pgs.

(56) References Cited

OTHER PUBLICATIONS

Burak, Usage Patterns of Friendzone-mobile Location-based Community Services, 2004; 8 pgs.
Campbell, Blogscape: Cartography on Social Networks, Dec. 12, 2005, 9 pgs.
CNET Review of Google Maps, Nov. 7, 2005, 6 pgs.
dodgeball.com, Company information, www.dodgeball.com, 2005, 2 pgs.
Entering the UMTS Era—Mobile Applications for Pocket Devices and Services, EITO, 2002, 17 pgs.
GeoCommunity Staff, Affiiliate and Reseller Programs for GIS, Geo-special and Location-based Content Websites, 2005, 5 pgs.
Johnson, Friends 2005: Hooking Up, Discover, vol. 26, No. 9, Sep. 2005, 2 pgs.
Karam, Decision on Appeal, U.S. Appl. No. 11/759,848, filed Sep. 17, 2013, 12 pgs.
Karam, Notice of Allowance, U.S. Appl. No. 11/323,090, dated Dec. 29, 2011, 8 pgs.
Karam, Notice of Allowance, U.S. Appl. No. 11/323,115, Jun. 28, 2010, 9 pgs.
Karam, Notice of Allowance, U.S. Appl. No. 11/323,142, dated Sep. 10, 2010, 8 pgs.
Karam, Notice of Allowance, U.S. Appl. No. 11/522,548, dated Mar. 8, 2010, 6 pgs.
Karam, Notice of Allowance, U.S. Appl. No. 11/759,848, dated Feb. 14, 2014, 9 pgs.
Karam, Notice of Allowance, U.S. Appl. No. 11/849,805, dated Jan. 5, 2011, 11 pgs.
Karam, Office Action, U.S. Appl. No. 11/323,090, dated Apr. 1, 2008, 4 pgs.
Karam, Office Action, U.S. Appl. No. 11/323,090, dated Oct. 1, 2008, 11 pgs.
Karam, Office Action, U.S. Appl. No. 11/323,090, dated Apr. 5, 2010, 11 pgs.
Karam, Office Action, U.S. Appl. No. 11/323,090, dated Jan. 7, 2008, 11 pgs.
Karam, Office Action, U.S. Appl. No. 11/323,090, dated Dec. 8, 2010, 12 pgs.
Karam, Office Action, U.S. Appl. No. 11/323,090, dated Jun. 10, 2008, 11 pgs.
Karam, Office Action, U.S. Appl. No. 11/323,090, dated Apr. 14, 2009, 12 pgs.
Karam, Office Action, U.S. Appl. No. 11/323,090, dated Jun. 15, 2011, 13 pgs.
Karam, Office Action, U.S. Appl. No. 11/323,090, dated Aug. 21, 2008 3 pgs.
Karam, Office Action, U.S. Appl. No. 11/323,090, dated Sep. 21, 2009, 12 pgs.
Karam, Office Action, U.S. Appl. No. 11/323,090, dated Jun. 24, 2009, 4 pgs.
Karam, Office Action, U.S. Appl. No. 11/323,090, dated Jun. 29, 2009, 3 pgs.
Karam, Office Action, U.S. Appl. No. 11/323,115, dated Apr. 1, 2009, 17 pgs.
Karam, Office Action, U.S. Appl. No. 11/323,115, dated Apr. 2, 2008, 15 pgs.
Karam, Office Action, U.S. Appl. No. 11/323,115, dated Mar. 11, 2010, 14 pgs.
Karam, Office Action, U.S. Appl. No. 11/323,115, dated Sep. 24, 2008, 15 pgs.
Karam, Office Action, U.S. Appl. No. 11/323,115, dated Aug. 28, 2009, 21 pgs.
Karam, Office Action, U.S. Appl. No. 11/323,142, dated Oct. 1, 2008, 4 pgs.
Karam, Office Action, U.S. Appl. No. 11/323,142, dated Feb. 3, 2009, 3 pgs.
Karam, Office Action, U.S. Appl. No. 11/323,142, dated Apr. 7, 2010, 9 pgs.
Karam, Office Action, U.S. Appl. No. 11/323,142, dated Oct. 20, 2009, 10 pgs.
Karam, Office Action, U.S. Appl. No. 11/323,142, dated Jun. 25, 2008, 10 pgs.
Karam, Office Action, U.S. Appl. No. 11/323,142, dated Nov. 26, 2008, 15 pgs.
Karam, Office Action, U.S. Appl. No. 11/323,142, dated Apr. 28, 2009, 23 pgs.
Karam, Office Action, U.S. Appl. No. 11/522,548, dated Oct. 1, 2008, 4 pgs.
Karam, Office Action, U.S. Appl. No. 11/522,548, dated Mar. 3, 2009, 4 pgs.
Karam, Office Action, U.S. Appl. No. 11/522,548, dated Jul. 8, 2008, 11 pgs.
Karam, Office Action, U.S. Appl. No. 11/522,548, dated Mar. 13, 2009, 5 pgs.
Karam, Office Action, U.S. Appl. No. 11/522,548, dated Dec. 22, 2008, 14 pgs.
Karam, Office Action, U.S. Appl. No. 11/522,548, dated Jun. 25, 2009, 11 pgs.
Karam, Office Action, U.S. Appl. No. 11/759,848, dated Oct. 1, 2008 4 pgs.
Karam, Office Action, U.S. Appl. No. 11/759,848, dated Mar. 3, 2009, 4 pgs.
Karam, Office Action, U.S. Appl. No. 11/759,848, dated Jun. 10, 2009, 11 pgs.
Karam, Office Action, U.S. Appl. No. 11/759,848, dated Jul. 11, 2008, 13 pgs.
Karam, Office Action, U.S. Appl. No. 11/759,848, dated Mar. 13, 2009, 4 pgs.
Karam, Office Action, U.S. Appl. No. 11/759,848, dated Mar. 16, 2009, 4 pgs.
Karam, Office Action, U.S. Appl. No. 11/759,848, dated Jan. 22, 2010, 11 pgs.
Karam, Office Action, U.S. Appl. No. 11/759,848, dated Aug. 24, 2009, 4 pgs.
Karam, Office Action, U.S. Appl. No. 11/759,848, dated Dec. 29, 2008, 12 pgs.
Karam, Office Action, U.S. Appl. No. 12/891,642, dated May 15, 2014, 16 pgs.
Laycock, Amazon's A9 Offers Unique Local Search Experience, Mar. 17, 2005, 4 pgs.
LocationNet.com, My Maps, LocationNet.com, Aug. 5, 2005, 2 pgs.
LocationNet.com, Products Demo, LocationNet.com, Aug. 5, 2005, 3 pgs.
Mates, When Social Networks Marry Presence, Om Malik's Broadband Blog, May 4, 2005, 3 pgs.
Mobile Marketing and Wireless Internet Advertising, Position Paper, InterACT Research Communications Co., Nov. 1999, 40 pgs.
Piesick, Click to Call: Creating Sales and Customer Satisfaction, ArriveNet Business Editorials, Sep. 7, 2005, 3 pgs.
Risnes, Developing Advanced Parley-enabled Value Added Services, Jan. 7, 2004, 18 pgs.
Saint-Andre, Extensive Messaging and Presence Protocol (XMPP): Instant Messaging and Presence, Oct. 2004, 90 pgs.
Schoder, Targeting Mobile Consumers: Context-independent Mobile B2C Applications, Lecture Unit 5, WHU, EEB FS, 2003, 21 pgs.
Smith, Spreading the Word with Moblogs, Jun. 15, 2005, 2 pgs.
Talk and IM With Your Friends for Fee, Google Talk, Dec. 22, 2005, 1 pg.
Vogiazou, Presence Based Play: Towards a Design for Large Group Social Interaction, May 6-8, 2003, 8 pgs.
WaveBlog product information, Demo 2004, 2004, 1 pg.
WaveMarket.com, Company and Product Overview, 2004, 12 pgs.
WaveMarket's Crunkie Puts Mobile Social Networks on the Map, Nov. 15, 2004, 5 pgs.
www.chatsum.com, Nov. 16, 2007, 4 pgs.
www.chatsum.com/about, Nov. 16, 2007, 2 pgs.
www.digg.com/software/new Page specific chat extension launched for firefox, Nov. 16, 2007, 3 pgs.
Karam, Final Office Action, U.S. Appl. No. 12/891,642, dated Sep. 28, 2015, 23 pgs.
Karam, Final Office Action, U.S. Appl. No. 12/891,642, dated Oct. 24, 2014, 21 pgs.

(56) References Cited

OTHER PUBLICATIONS

Karam, Office Action, U.S. Appl. No. 13/620,555, dated Apr. 9, 2015, 24 pgs.
Karam, Office Action, U.S. Appl. No. 12/891,642, dated May 13, 2015, 21 pgs.
Karam, Office Action, U.S. Appl. No. 13/620,555, dated Apr. 7, 2016, 29 pgs.

* cited by examiner

METHOD, SYSTEM, AND GRAPHICAL USER INTERFACE FOR MEETING-SPOT-RELATED CONTACT LISTS

RELATED APPLICATIONS

This application is a continuation of U.S. Pat. No. 8,756,501, which patent is hereby incorporated by reference herein in its entirety. U.S. Pat. No. 8,756,501 is a continuation of U.S. Pat. No. 7,797,642, which patent is hereby incorporated by reference herein in its entirety. U.S. Pat. No. 7,797,642 is a continuation-in-part of U.S. Pat. No. 7,917,866, which patent is hereby incorporated by reference herein in its entirety.

This application is related to U.S. patent application Ser. No. 11/323,090, filed Dec. 30, 2005, entitled "Method, System, and Graphical User Interface for Meeting-Spot Maps for Online Communications," which application is incorporated by reference herein in its entirety.

This application is related to U.S. Pat. No. 7,831,917, filed Dec. 30, 2005, entitled "Method, System, and Graphical User Interface for Identifying and Communicating with Meeting Spots," which patent is hereby incorporated by reference herein in its entirety.

TECHNICAL FIELD

The disclosed embodiments relate generally to online communications. More particularly, the disclosed embodiments relate to methods, systems, and graphical user interfaces for meeting-spot-related online communications.

BACKGROUND

People increasingly use online communications to interact with their friends and to meet new people. As used herein, "online communications" means real-time online communications technologies, including character-based technologies (e.g., text-based instant messaging, but not e-mail), audio technologies (e.g., audio chat and Voice over Internet Protocol (VoIP) telephony), and video technologies (e.g., video chat).

Numerous techniques have been developed that use online communications to improve our social lives, including social networking and online dating services. These techniques typically require a user to fill out a personal profile, which can be cumbersome and also raises privacy concerns. Thus, it would be highly desirable to find new, less cumbersome, more intuitive, and more secure ways to use online communications to interact with friends and to meet new people.

SUMMARY

The present invention overcomes the limitations and disadvantages described above by providing methods, systems, and graphical user interfaces (GUIs) for introductions via meeting-spot-related online communications. As used herein, a "meeting spot" is a specific physical location where two or more people could arrange to meet face to face. Exemplary meeting spots include, without limitation, a restaurant, bar, club, library, gym, bookstore, park, or store. Note that a meeting spot is limited in size so that two people can find (or can reasonably be expected to find) each other at the spot. For example, Manhattan is too large to be a meeting spot, but the Four Seasons restaurant at 99 E. 52nd St. in Manhattan could be a meeting spot.

One aspect of the invention involves a computer-implemented method in which a server computer: associates a first user with a meeting spot; identifies a plurality of other users that are also associated with the meeting spot; sends information about at least some of the plurality of other users to a client device associated with the first user; receives information that corresponds to a second user associated with the meeting spot from the client device associated with the first user; identifies a third user that is associated with the first user and is also associated with the second user; and sends information about the third user to the client device associated with the first user. The client device associated with the first user: displays at least some of the information about the third user; receives from the first user a request to communicate with the third user; sends a communication to a client device associated with the third user; and participates in an online communication with the client device associated with the third user and a client device associated with the second user.

Another aspect of the invention involves a computer-implemented method in which a server computer: associates a first user with a meeting spot; identifies a plurality of other users that are also associated with the meeting spot; and sends information about at least some of the plurality of other users to a client device associated with the first user. The sent information includes, for a respective other user, information about a respective third user that is associated with both the respective other user and the first user. The client device associated with the first user: receives from the first user a selection of a second user in the plurality of other users; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

Another aspect of the invention involves a computer-implemented method in which a client device associated with a first user: receives from a server computer information about a plurality of other users associated with a meeting spot; displays an identifier for the meeting spot and at least some of the information for the plurality of other users associated with the meeting spot; receives from the first user a selection of a second user in the plurality of other users; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

Another aspect of the invention involves a computer-implemented method in which a client device associated with a third user: receives an automatically generated online communication from a first user with a request to introduce the first user to a second user. The third user is associated with both the first user and the second user. The first user and the second user are both associated with a meeting spot. The method also initiates an online communication amongst the first user, the second user, and the third user.

Another aspect of the invention involves a graphical user interface on a client device associated with a first user that includes: an identifier for a meeting spot; information about a plurality of other users that are associated with the meeting spot, including information about a second user associated with the meeting spot; and information about a third user. The third user is associated with the first user and is also associated with the second user. In response to receiving a selection of the second user from the first user, the information about the third user is displayed. In response to receiving from the first user a request to communicate with the third user, a communication is sent to a client device associated with the third user and the client device associated with the first user participates in an online communication with the client device associated with the third user and a client device associated with the second user.

Another aspect of the invention involves a server that includes one or more processors, memory; and one or more programs. The one or more programs are stored in the memory and configured to be executed by the one or more processors. The programs include: instructions for associating a first user with a meeting spot; instructions for identifying a plurality of other users that are also associated with the meeting spot; and instructions for sending information about at least some of the plurality of other users to a client device associated with the first user. The sent information includes, for a respective other user, information about a respective third user that is associated with both the respective other user and the first user. The client device associated with the first user: receives from the first user a selection of a second user in the plurality of other users; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

Another aspect of the invention involves a client device associated with a first user that includes one or more processors, memory; and one or more programs. The one or more programs are stored in the memory and configured to be executed by the one or more processors. The programs include: instructions for receiving from a server computer information about a plurality of other users associated with a meeting spot; instructions for displaying an identifier for the meeting spot and at least some of the information for the plurality of other users associated with the meeting spot; instructions for receiving from the first user a selection of a second user in the plurality of other users; instructions for displaying information about a third user, wherein the third user is associated with the first user and is also associated with the second user; instructions for receiving from the first user a request to communicate with the third user; instructions for sending a communication to a client device associated with the third user; and instructions for participating in an online communication with the client device associated with the third user and a client device associated with the second user.

Another aspect of the invention involves a client device associated with a third user that includes one or more processors, memory; and one or more programs. The one or more programs are stored in the memory and configured to be executed by the one or more processors. The programs include instructions for receiving an automatically generated online communication from a first user with a request to introduce the first user to a second user. The third user is associated with both the first user and the second user. The first user and the second user are both associated with a meeting spot. The programs also include instructions for initiating an online communication amongst the first user, the second user, and the third user.

Another aspect of the invention involves a computer-program product that includes a computer readable storage medium and a computer program mechanism embedded therein. The computer program mechanism includes instructions, which when executed by a server, cause the server to: associate a first user with a meeting spot; identify a plurality of other users that are also associated with the meeting spot; and send information about at least some of the plurality of other users to a client device associated with the first user. The sent information includes, for a respective other user, information about a respective third user that is associated with both the respective other user and the first user. The client device associated with the first user: receives from the first user a selection of a second user in the plurality of other users; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

Another aspect of the invention involves a computer-program product that includes a computer readable storage medium and a computer program mechanism embedded therein. The computer program mechanism includes instructions, which when executed by a client device associated with a first user, cause the client device to: receive from a server computer information about a plurality of other users associated with a meeting spot; display an identifier for the meeting spot and at least some of the information for the plurality of other users associated with the meeting spot; receive from the first user a selection of a second user in the plurality of other users; display information about a third user, wherein the third user is associated with the first user and is also associated with the second user; receive from the first user a request to communicate with the third user; send a communication to a client device associated with the third user; and participate in an online communication with the client device associated with the third user and a client device associated with the second user.

Another aspect of the invention involves a computer-program product that includes a computer readable storage medium and a computer program mechanism embedded therein. The computer program mechanism includes instructions, which when executed by a client device associated with a third user, cause the client device to receive an automatically generated online communication from a first user with a request to introduce the first user to a second user. The third user is associated with both the first user and the second user. The first user and the second user are both associated with a meeting spot. The instructions also cause the client device to initiate an online communication amongst the first user, the second user, and the third user.

Another aspect of the invention involves a server computer, comprising: means for associating a first user with a meeting spot; means for identifying a plurality of other users that are also associated with the meeting spot; and means for sending information about at least some of the plurality of other users to a client device associated with the first user. The sent information includes, for a respective other user, information about a respective third user that is associated with both the respective other user and the first user. The client device associated with the first user: receives from the first user a selection of a second user in the plurality of other users; displays information about a third user, wherein the third user is associated with the first user and is also associated with the second user; receives from the first user a request to communicate with the third user; sends a communication to a client device associated with the third user; and participates in an online communication with the client device associated with the third user and a client device associated with the second user.

Another aspect of the invention involves a client device associated with a first user, comprising: means for means for receiving from a server computer information about a plurality of other users associated with a meeting spot; means for displaying an identifier for the meeting spot and at least some of the information for the plurality of other users associated with the meeting spot; means for receiving from the first user a selection of a second user in the plurality of other users; means for displaying information about a third user, wherein the third user is associated with the first user and is also associated with the second user; means for receiving from the first user a request to communicate with the third user; means for sending a communication to a client device associated with the third user; and means for participating in an online communication with the client device associated with the third user and a client device associated with the second user.

Another aspect of the invention involves a client device associated with a third user, comprising means for receiving an automatically generated online communication from a first user with a request to introduce the first user to a second user. The third user is associated with both the first user and the second user. The first user and the second user are both associated with a meeting spot. The client device associated with the third user also comprises means for initiating an online communication amongst the first user, the second user, and the third user.

Thus, introductions via meeting-spot-related online communications provide more intuitive, less invasive methods, systems, and GUIs to interact with friends and to meet new people.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, and graphical user interfaces for meeting-spot-related online communications are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
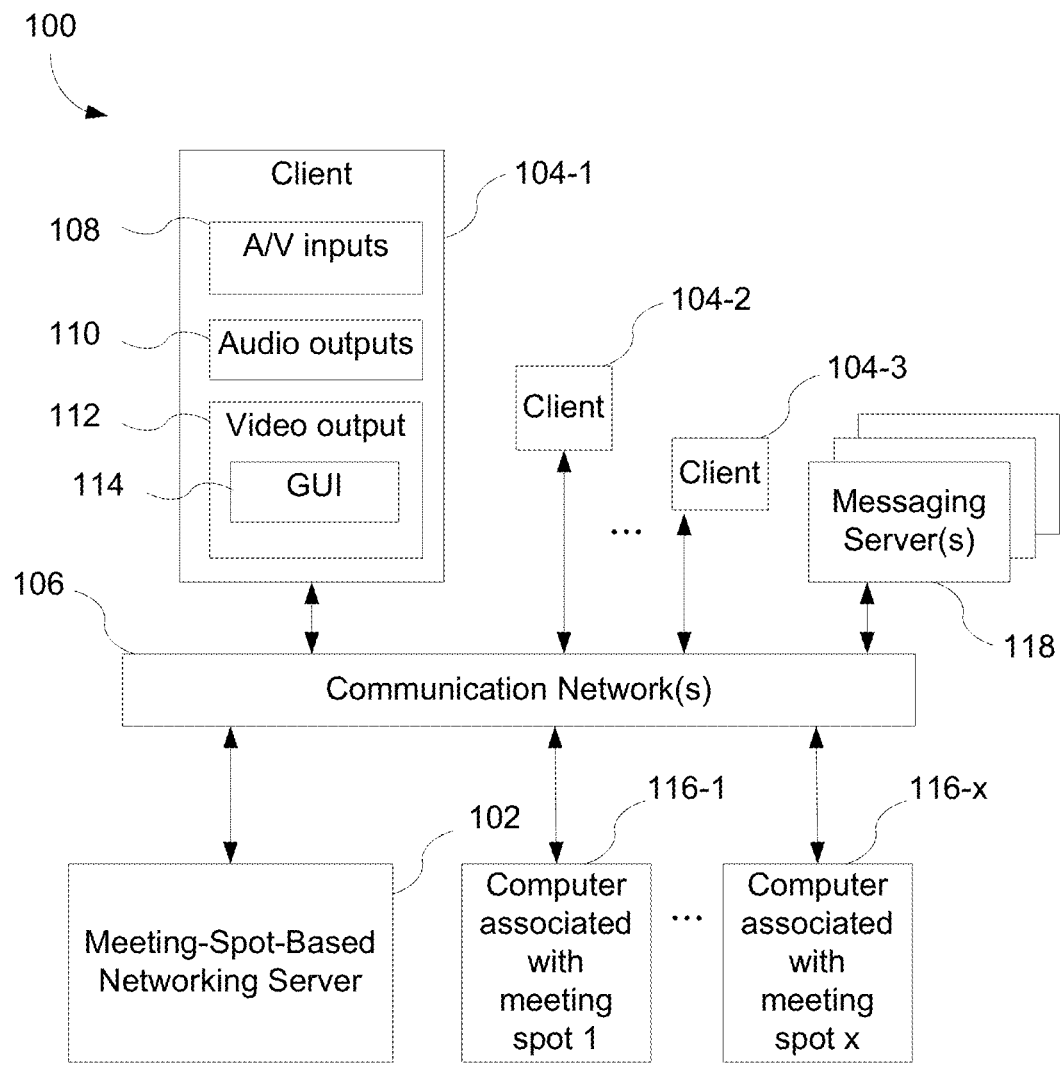
FIG. 1 is a block diagram illustrating an exemplary distributed computer system in accordance with some embodiments.

FIG. 1 is a block diagram illustrating an exemplary distributed computer system 100 in accordance with some embodiments. FIG. 1 shows various functional components that will be referred to in the detailed discussion that follows. This system includes client devices 104, meeting-spot-based networking server 102, a computer associated with a meeting spot 116, messaging server(s) 118, and communication network(s) 106 for interconnecting these components.

Client 104 can be any of a number of devices (e.g., an internet kiosk, personal digital assistant, cell phone, gaming device, desktop computer, laptop computer, handheld computer, or a combination thereof) used to enable the activities described below. Client 104 typically includes audio and/or video inputs 108 (e.g., a microphone and a video camera), audio output 110 (e.g., speakers or headphones), and video output 112 (e.g., a display). Video output 112 displays a graphical user interface (GUI) 114.

The computer 116 associated with the meeting spot may be a computer used to make reservations for the meeting spot or to provide other services associated with the meeting spot. Computer 116 may optionally be used to host chat rooms or other multi-user communications. The computer 116 associated with the meeting spot may be located at the meeting spot, or anywhere else (e.g., at the facility of a computer services provider that provides services for the meeting spot).

One or more messaging servers 118 provide online communications services to clients 104. The messaging servers 118 store information associated with the users of the service, user status information, and contact lists of users, further details of which are described below, in relation to FIGS. 18A-18C. In some embodiments, the messaging servers 118 store and relay online communications to and from clients 104. In some other embodiments, the messaging servers 118 provide information to be used by a client to directly connect to another client (e.g., using peer-to-peer connection methodologies). The messaging servers 118 and clients 104 may utilize any of a plurality of online communications protocols, including but not limited to Internet Relay Chat (IRC), OSCAR, JABBER, etc. In some embodiments, the functions of messaging server(s) 118 are incorporated in meeting-spot-based networking server 102, e.g., as part of network communications module 212.

In some embodiments, the messaging servers 118 monitor and manage the status information of the users of one or more online communications services (e.g., text messaging, audio chat, VoIP telephony, and/or video chat). Whenever a client application associated with a user of the online communications service is not running on a client or is running but is otherwise not in communication with the messaging servers 118, the user is considered to be offline. If the client application is running and is in communication with the messaging servers 118, the user is considered to be online. Whenever a user goes from offline to online, the client application (e.g. text messaging module 314, audio module 316, or video module 318) sends a message to the messaging servers 118 announcing the change in status. The messaging servers 118 update the status information associated with the user to reflect the status change. The messaging servers 118 may forward the status of a user A to a client application associated with a user B who is interested in the status of user A. In some embodiments, the status of user A is forwarded to user B and other users by a broadcast or multicast message.

The status information monitored by the messaging servers 118 may be further refined. One or more predefined statuses may be provided and serve as a default set of statuses. One or more status messages, which are text strings that describe the status in further detail, may be associated with the predefined statues. The client application may be set to any one of the predefined statuses by user intervention or as an automatic response to particular events. The predefined statuses serve to indicate in greater detail the user's willingness and/or availability to exchange online communications with other users.

In some embodiments, the predefined user statuses may include "active," "idle," "busy," "chatty," and "offline." "Active" means that the user is available to send and/or receive online communications. "Idle" (or "away") means that the user has not been actively using the client for at least a specified amount of time, and by implication, is away from the client. "Busy" means that the user is preoccupied with other matters (e.g., actively using another client application) and is not available for sending and/or receiving online communications. "Chatty" means that the user is actively sending and/or receiving online communications and may be willing to send and/or receive more. "Offline" means that the user is offline, as described above. A user that is "active," "idle," "busy," or "chatty" is also online because the client application is running and in communication with the messaging servers 118.

It should be appreciated that the statuses described above are merely exemplary. Additional and/or alternative statuses may also be used.

In some embodiments, a user may also define custom statuses and/or custom status messages. For example, a user may define a custom status message saying that he or she is "on vacation."

The messaging servers 118 may also store, for each user of the online communications service, a contact list (sometimes called a buddy list, address book, or the like). The contact list is a roster of one or more contacts associated with the user. A contact is a person with whom the user has previously communicated (by email, voice, IM, video chat, or the like) or with whom the user may wish to choose to communicate (e.g., other users associated with a meeting spot that has been entered and/or tagged by the user). The contact list associates contacts with one or more communication addresses or locators (email address, IM address, phone number, and so on) as well as other information such as a name or profile. A contact may or may not participate in the same IM network as the user and therefore may or may not be reachable over IM. Further information regarding the contact list is described below.

Figure 2:
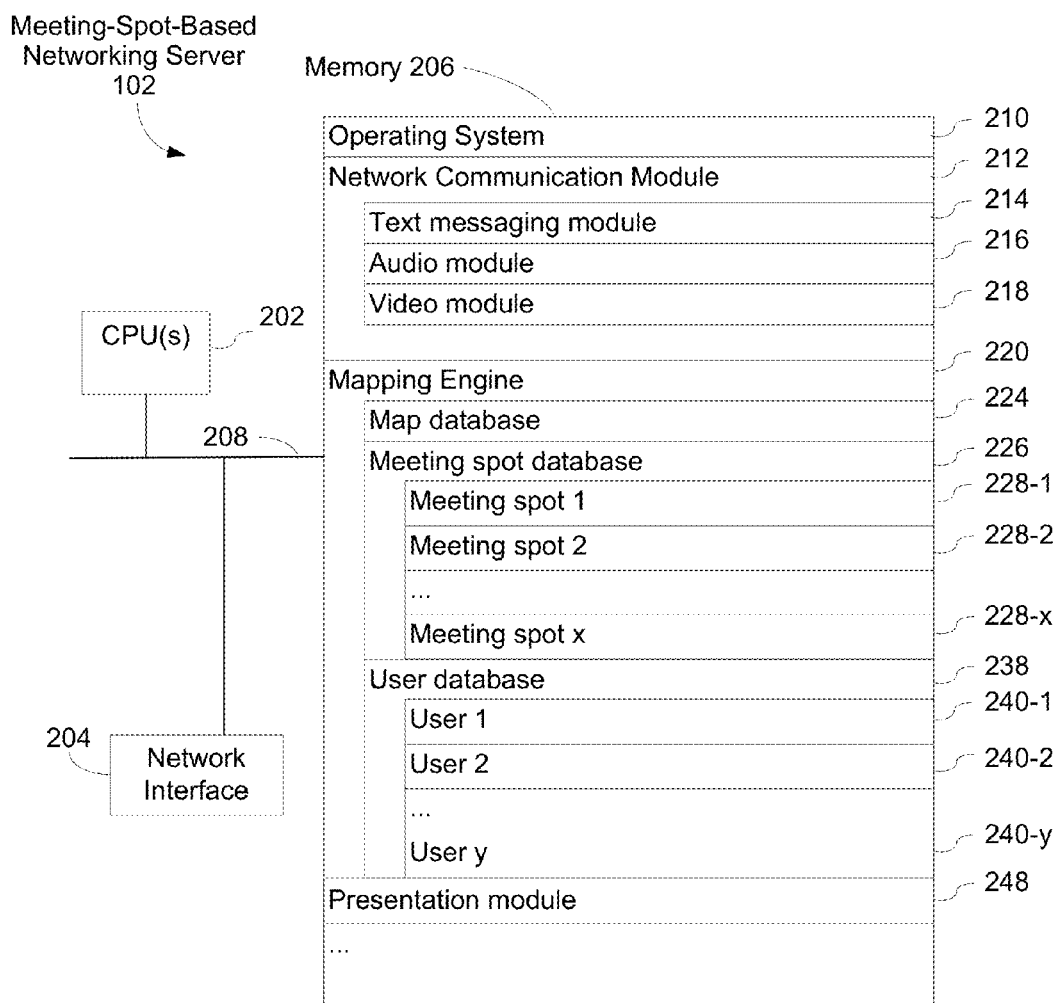
FIG. 2 is a block diagram illustrating a meeting-spot-based networking server in accordance with some embodiments.

FIG. 2 is a block diagram illustrating meeting-spot-based networking server 102 in accordance with some embodiments. Server 102 typically includes one or more processing units (CPUs) 202, one or more network or other communications interfaces 204, memory 206, and one or more communication buses 208 for interconnecting these components. Server 102 may optionally include a graphical user interface (not shown), which typically includes a display device, a keyboard, and a mouse or other pointing device. Memory 206 may include high-speed random access memory and may also include non-volatile memory, such as one or more magnetic disk storage devices, optical disk storage devices, flash memory devices, or other non-volatile solid state storage devices. Memory 206 may optionally include mass storage that is remotely located from CPUs 202. Memory 206 may store the following programs, modules and data structures, or a subset or superset thereof:

- Operating System 210 that includes procedures for handling various basic system services and for performing hardware dependent tasks;
- Network Communication Module (or instructions) 212 that is used for connecting server 102 to other computers (e.g., clients 104) via the one or more communications Network Interfaces 204 (wired or wireless) and one or more communications networks 106 (FIG. 1), such as the Internet, other wide area networks, local area networks, metropolitan area networks, and so on;
- Mapping Engine 220 that receives meeting-spot-related requests from and provides responses to clients 104, including requests and responses for maps with meeting spots and/or contact lists with meeting-spot-related information; and
- Presentation module 248 that formats the results from mapping engine 220 for display.

Network Communication Module 212 may include the following programs, modules and data structures, or a subset or superset thereof:

- Text messaging module 214 that coordinates text messaging (e.g., instant messaging) between clients 104;
- Audio module 216 that coordinates audio communications (e.g., voice chat or VoIP) between clients 104; and
- Video module 218 that coordinates video communications (e.g., video chat) between clients 104.

In some embodiments, the text messaging, audio or voice communications, and/or video communications between clients 104 are performed in a manner that does not require the use of server 102, such as via peer-to-peer networking.

Mapping Engine 220 may include the following programs, modules and data structures, or a subset or superset thereof:

- Map database 224 that stores mapping data;
- Meeting spot database 226 that stores records 228 for meeting spots (e.g., records 228-1, 228-2 and 228-x for meeting spots 1, 2 and x, respectively); and
- User database 238 that stores records 240 for users (e.g., records 240-1, 240-2, 240-7 for Users 1, 2 and y, respectively)

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in server 102 and how features are allocated among them will vary from one implementation to another, and may depend in part on the amount of data traffic that the system must handle during peak usage periods as well as during average usage periods.

Figure 3A:
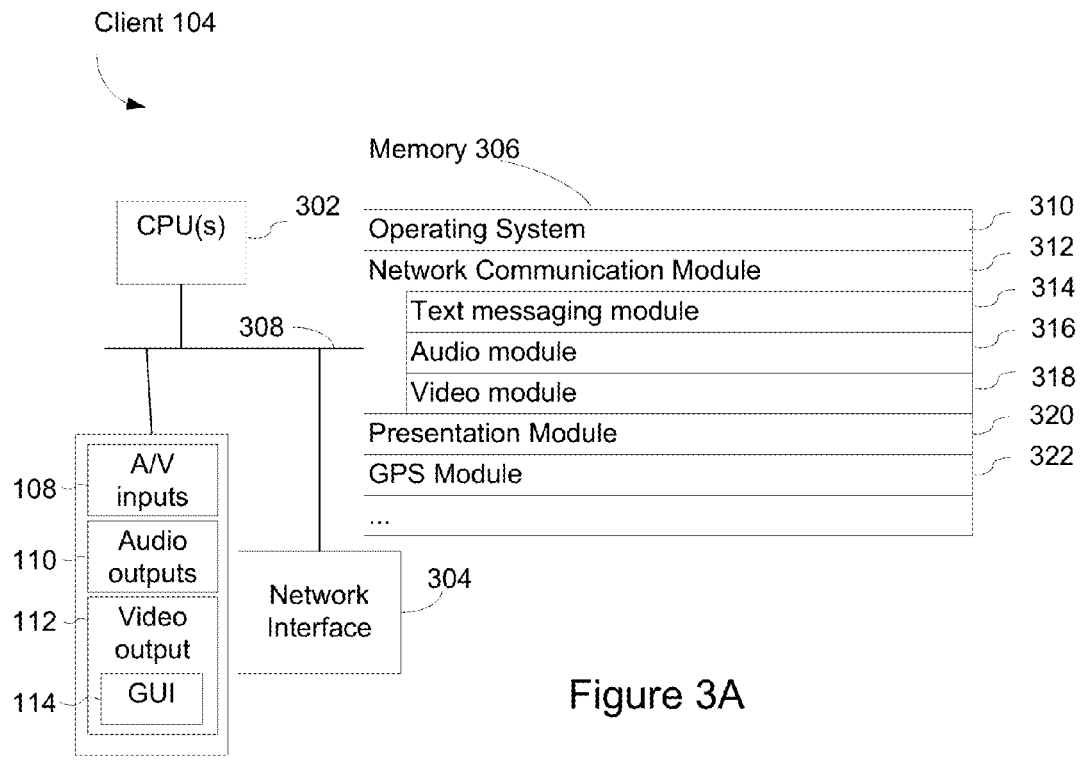
FIGS. 3A and 3B are block diagrams illustrating two exemplary clients.
Figure 3B:
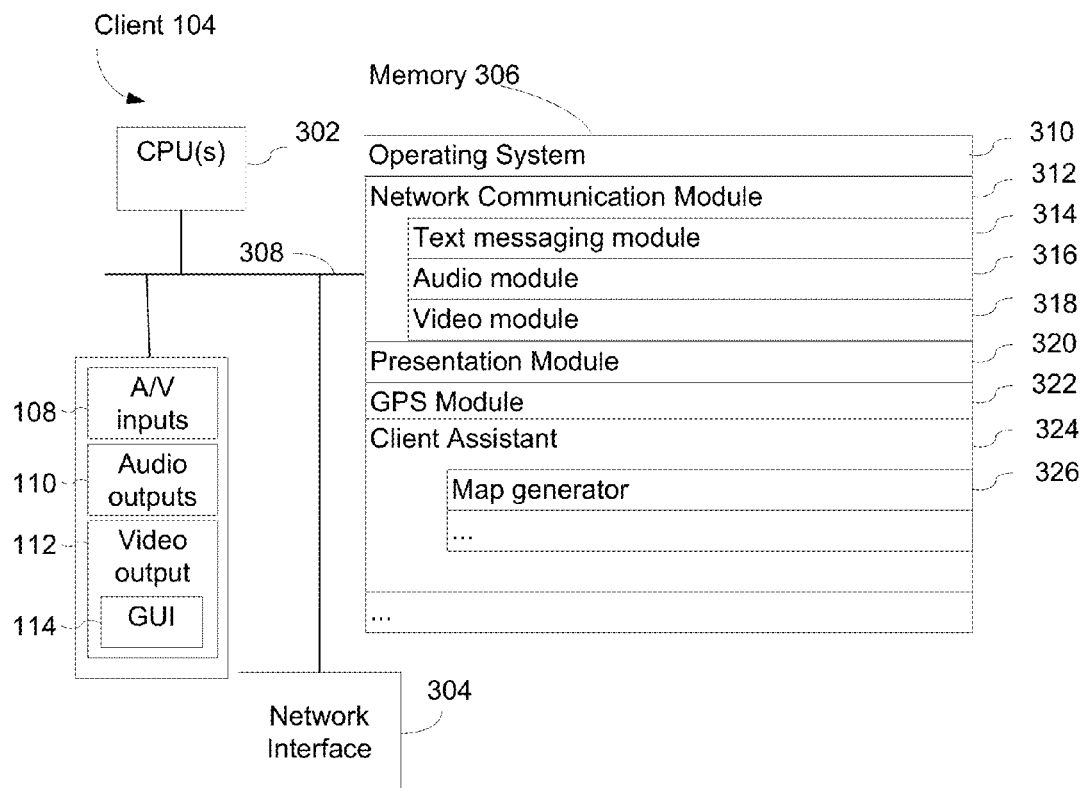

FIGS. 3A and 3B are block diagrams illustrating two exemplary clients 104. As noted above, client 104 typically includes audio/video inputs 108 (e.g., a microphone and a video camera), audio output 110 (e.g., speakers or headphones), and video output 112 (e.g., a display). Video output 112 displays graphical user interface (GUI) 114. Client 104 typically includes one or more processing units (CPUs) 302, one or more network or other communications interfaces 304, memory 306, and one or more communication buses 308 for interconnecting these components. Memory 306 may include high-speed random access memory and may also include non-volatile memory, such as one or more magnetic disk storage devices, optical disk storage devices, flash memory devices, or other non-volatile solid state storage devices. Memory 306 may store the following programs, modules and data structures, or a subset or superset thereof:

- Operating System 310 that includes procedures for handling various basic system services and for performing hardware dependent tasks;
- Network Communication Module (or instructions) 312 that is used for connecting client 104 to other computers (e.g., server 102 and other clients 104) via the one or more communications Network Interfaces 304 (wired or wireless) and one or more communication networks 106 (FIG. 1), such as the Internet, other wide area networks, local area networks, metropolitan area networks, and so on;
- Presentation Module 320, for formatting the maps, meeting spots, and other data (e.g., user icons and text chat) for display in GUI 114, which may include a browser application as well as procedures or instructions embedded in web pages received from the server 102;
- Global Positioning System (GPS) Module (or instructions) 322 for determining the location of client 104; and
- Client Assistant 324, which handles data formatting and/or management tasks, at least some of which could also be handled by Mapping Engine 220.

Network Communication Module 312 may include the following programs, modules and data structures, or a subset or superset thereof:

- Text messaging module 314 that supports text messaging (e.g., instant messaging) between clients 104;
- Audio module 316 that supports audio communications (e.g., voice chat or VoIP) between clients 104; and
- Video module 318 that supports video communications (e.g., video chat) between clients 104.

As illustrated schematically in FIG. 3B, client 104 can incorporate modules, applications, and instructions for performing a variety of mapping related processing tasks (e.g., map generator 326), at least some of which could be handled by Mapping Engine 220 in server 102 instead. Alternatively, in some embodiments, client 104 can contain less functionality than shown in FIG. 3A. For example, in some embodiments, client 104 need not have a GPS Module 322.

Figure 4:
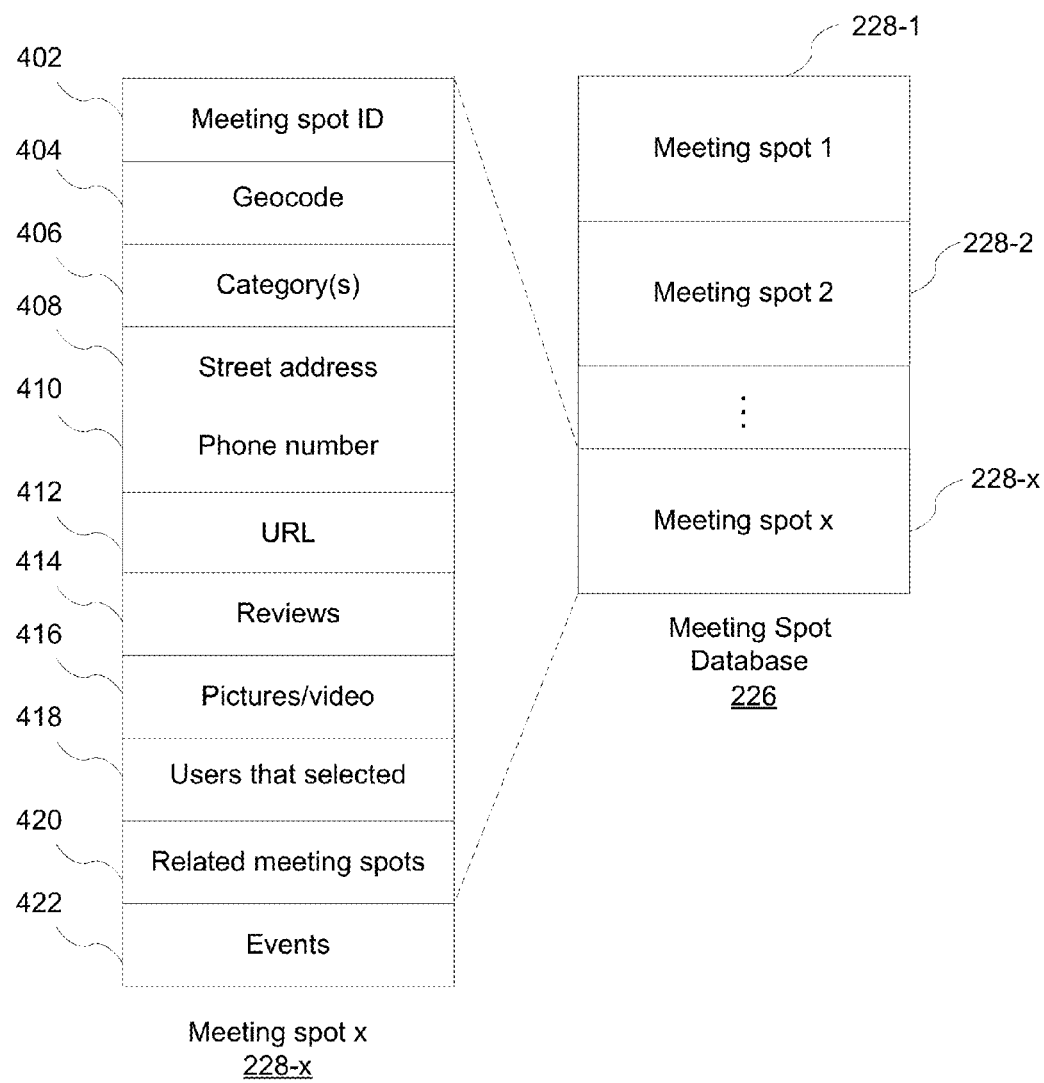
FIG. 4 is a block diagram illustrating an exemplary meeting spot database and an exemplary meeting spot record in accordance with some embodiments.

FIG. 4 is a block diagram illustrating an exemplary meeting spot database 226 and an exemplary meeting spot record 228 in accordance with some embodiments. Meeting Spot Database 226 stores meeting spot records 228, for example meeting spot 1 (228-1) through meeting spot x (228-x), where x may represent the number of meeting spots.

A meeting spot record (e.g., meeting spot x 228-x) may include the following data, or a subset or superset thereof:

Meeting spot ID 402 that uniquely identifies a particular meeting spot (e.g., an n-bit binary number);

Geocode 404 that corresponds to the location of the meeting spot;

Category(s) 406 that classify the meeting spot (e.g., dining, exercising, partying, playing, shopping, or watching);

Street address 408 for the meeting spot;

Phone number 410 for the meeting spot;

URL 412 for a web page or site associated with the meeting spot;

Reviews 414 of the meeting spot by users and/or professional reviewers, or the URL or a link to a web page or site that hosts such reviews);

Pictures/videos 416 of the meeting spot, or the URL or a link to a web page or site that hosts such reviews;

Users IDs of users that have selected the meeting spot 418;

Meeting spot IDs of other meeting spots that are related to the meeting spot associated with meeting spot ID 402 (e.g., other nearby meeting spots); and Events 422 that includes dates and times for events occurring at the meeting spot.

In some embodiments, events 422 permit a temporal component to be added to meeting spots. In some embodiments, a user can tag, enter, or otherwise select particular past, present, or future events at meeting spots. Thus, a meeting-spot-based user interest profile 508 can also include particular events at meeting spots that the user has selected. User-selected events can change the similarity scores between the computer user and other computer users and, correspondingly, the display of information concerning the other computer users. For example, information about other users 932 that have selected some of the same events as the user may be displayed more prominently (e.g., at higher display positions in a list 960).

Figure 5:
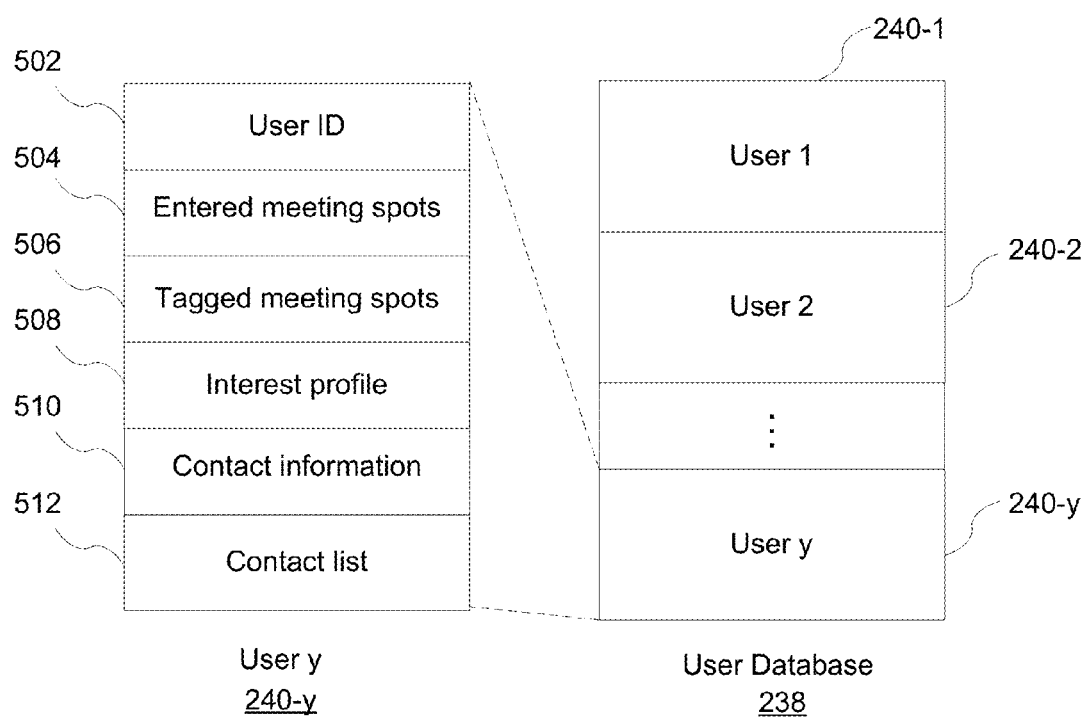
FIG. 5 is a block diagram illustrating an exemplary user database and an exemplary record for a particular user in accordance with some embodiments.

FIG. 5 is a block diagram illustrating an exemplary user database 238 and an exemplary record 240-*y* for a particular user in accordance with some embodiments. User Database 238 stores user records 240, for example User 1 (240-1) through User y (240-*y*), where y may represent the number of users.

A user record 240 (e.g., record 240-*y* for User y) may include the following data, or a subset or superset thereof:

User ID 502 that uniquely identifies a particular user (e.g., an n-bit binary number);

Entered meeting spots 504, e.g., meeting spot IDs that correspond to meeting spots that the user has chosen to enter;

Tagged meeting spots 506, e.g., meeting spot IDs that correspond to meeting spots that the user has chosen to tag (e.g., to tag as a favorite meeting spot);

Interest profile 508 for the user that is based at least in part on the meeting spots selected by the user (e.g., by entering and/or tagging);

Contact information 510 for the user (e.g., online communications address(es), and/or phone number(s) for the user); alternately, this field 510 of the user record may contain a link to the user's contact information; and Contact list 512 for the user that contains the contact information of other users known to the user; alternately, this field 512 of the user record may contain a link to the user's contact list (e.g., in messaging server 118).

As used herein, "entered meeting spots" are meeting spots in a GUI that a user has presently selected. For example, the user may be exploring meeting spots that the user has not visited before (e.g., to see which other users have also currently selected the corresponding meeting spot in their GUI). As used herein, "tagged meeting spots" are meeting spots in a GUI that the user has tagged or otherwise labeled, independent of whether the user has currently selected (entered) the tagged meeting spot. By analogy to web browsing, a user may have currently selected several web pages for viewing (e.g., via tabbed browsing or multiple windows) and some of those web pages may have been bookmarked by the user. In this analogy, entered meeting spots are analogous to currently selected web pages and tagged meeting spots are analogous to bookmarked web pages. Both entered meeting spots and tagged meeting spots can be used to determine a user's interest profile. In some embodiments, a user' interest profile is updated in real time as the user enters and leaves meeting spots and/or as the user tags and untags meeting spots.

Figure 6:
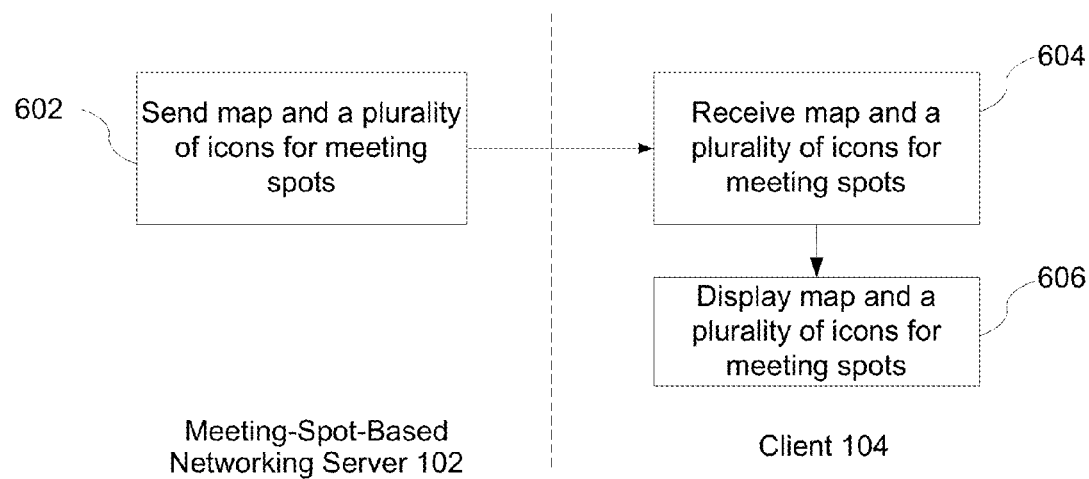
FIG. 6 is a flowchart representing a method of using maps of meeting spots to facilitate or initiate online communications in accordance with some embodiments.

FIG. 6 is a flowchart representing a method of using maps of meeting spots to facilitate or initiate online communications in accordance with some embodiments. FIG. 6 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2.

Server 102 sends (602) a map to client 104 along with a plurality of icons for meeting spots that are to be overlaid on the map when displayed at the client. In some embodiments, the map and icons are sent using a single data structure, while in other embodiments the map and the icons are sent using distinct data structures—in which case the map and icon images are merged during the display process. In some embodiments, the map and the plurality of meeting spot icons are generated by mapping engine 220 using data in mapping database 224 and meeting spot database 226.

Client 104 receives (604) the map and the plurality of icons for meeting spots.

Client 104 displays (606) the map and the plurality of icons for meeting spots overlaid on the map in a GUI. In some embodiments, presentation module 320 (FIG. 3A) formats the received map and meeting spot icon data for display.

Figure 7:
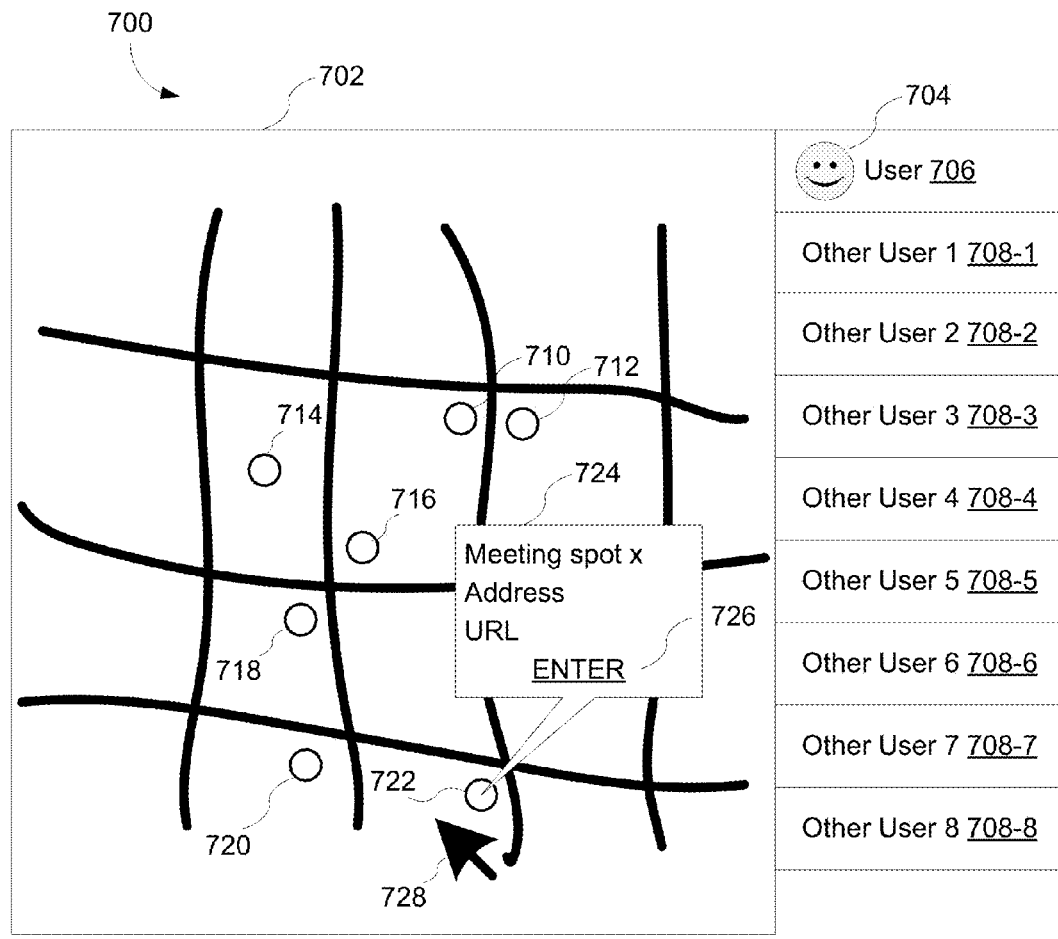
FIG. 7 is a schematic screen shot of an exemplary graphical user interface of a map with user-selectable meeting spots in accordance with some embodiments.

FIG. 7 is a schematic screen shot of an exemplary graphical user interface of a map with user-selectable meeting spots in accordance with some embodiments. In some embodiments, GUI 700 includes map 702, meeting spots 710-722, and icons 708 (i.e., visual elements in the GUI) with information about other users 708. In some embodiments, GUI 700 includes an icon 706 with user information (e.g., the user's screen name for online communications, and optionally an icon 704 representing the user). The information about other users contained in icons 708 may include, without limitation, the screen names for the other users and icons (e.g., thumbnails images or other icons analogous to the user's icon 704) that represent the other users in online communications.

In some embodiments, selection of a meeting spot icon (e.g., icon 710) by a user at client device 104 initiates the display of information about other users (e.g., other user icons 708 in FIG. 7) that have also selected the same meeting spot icon, thereby facilitating online communications with one or more of the other users. In some embodiments, selection of a meeting spot icon is done by the user clicking cursor 728 on the icon. In some embodiments, selection of a meeting spot icon is done by the user hovering the cursor 728 over the icon, which results in the display of more information 724 about the meeting spot and a link (e.g., ENTER link 726) that the user can activate to select the corresponding meeting spot.

In some embodiments, the meeting spot icon is selected by the user clicking on a predefined region that includes the meeting spot (e.g., clicking down and then up on a button while cursor 728 is over the meeting spot icon, or just clicking down on the button, or just clicking up on the button), placing (or hovering) cursor 728 over or near the meeting spot icon for a predetermined period of time (e.g., a mouse-hover), or other activity indicating that the user expects to activate a feature associated with the meeting spot icon. One of ordinary skill in the art would recognize various ways to identify a user-initiated activity as described above such as by recognizing a click-down event and/or click-up event, or monitoring the movement of the cursor over a period of time. This could be done, for example, by the client assistant 324 or operating system 310.

In some embodiments, selection of a meeting spot icon (e.g., icon 710) by a user at client device 104 initiates online communications (e.g., a text, audio, or video chat) with one or more other users that have also selected "the same meeting spot icon" (e.g., by selecting a corresponding meeting spot icon in a GUI on their respective client devices 104).

Figure 8A:
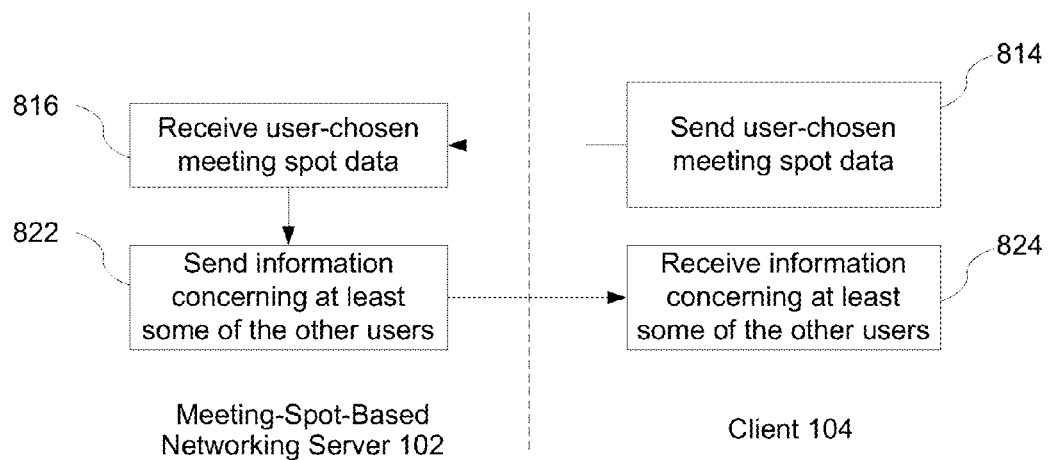
FIGS. 8A and 8B are flowcharts representing methods of using meeting spots selected by a computer user to facilitate online communications with other computer users in accordance with some embodiments.
Figure 8B:
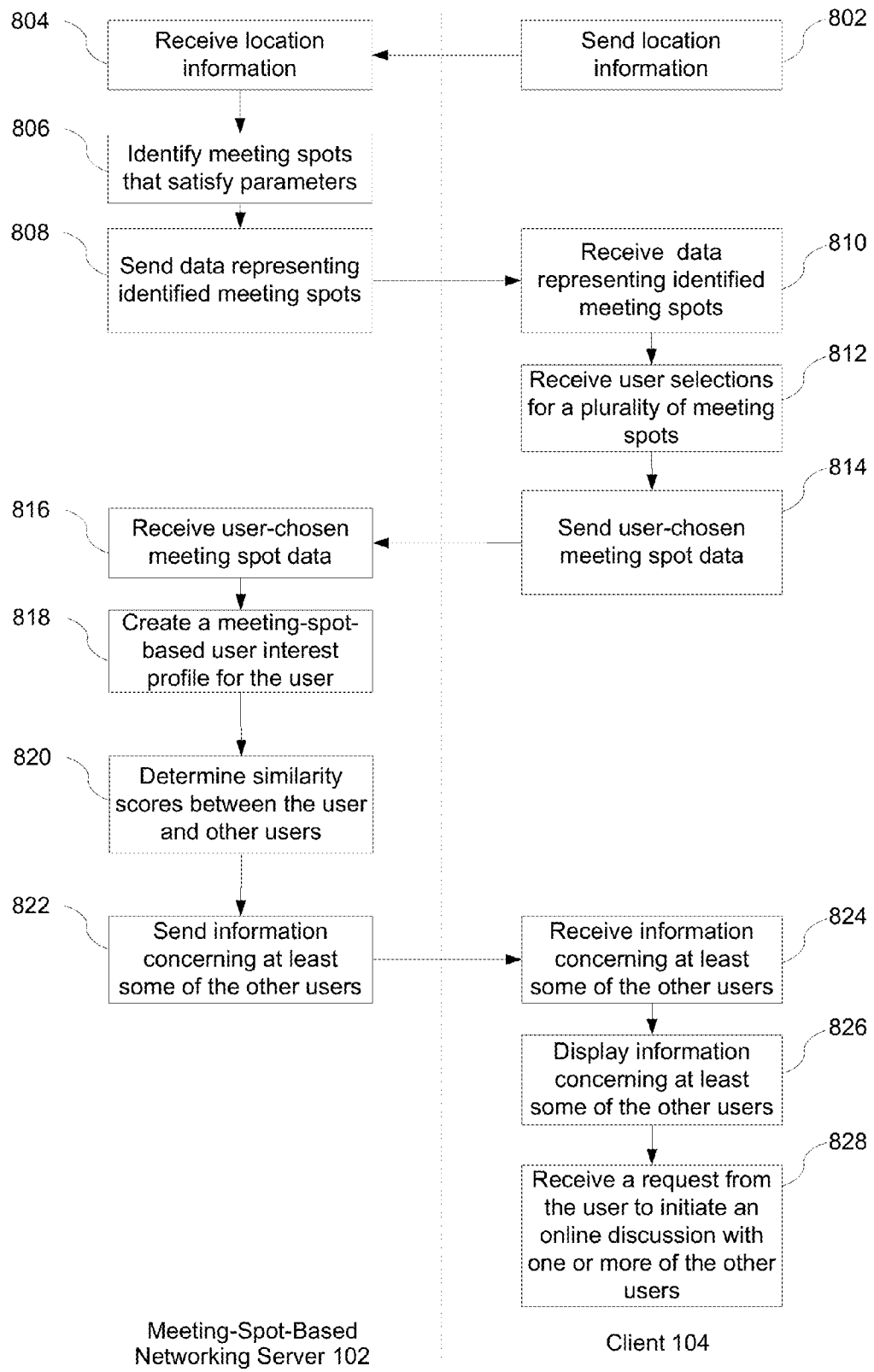

FIGS. 8A and 8B are flowcharts representing methods, performed by server 102 and client 104, of using meeting spots selected by a computer user to facilitate online communications with other computer users in accordance with some embodiments. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIGS. 8A and 8B are further described below.

Figure 9:
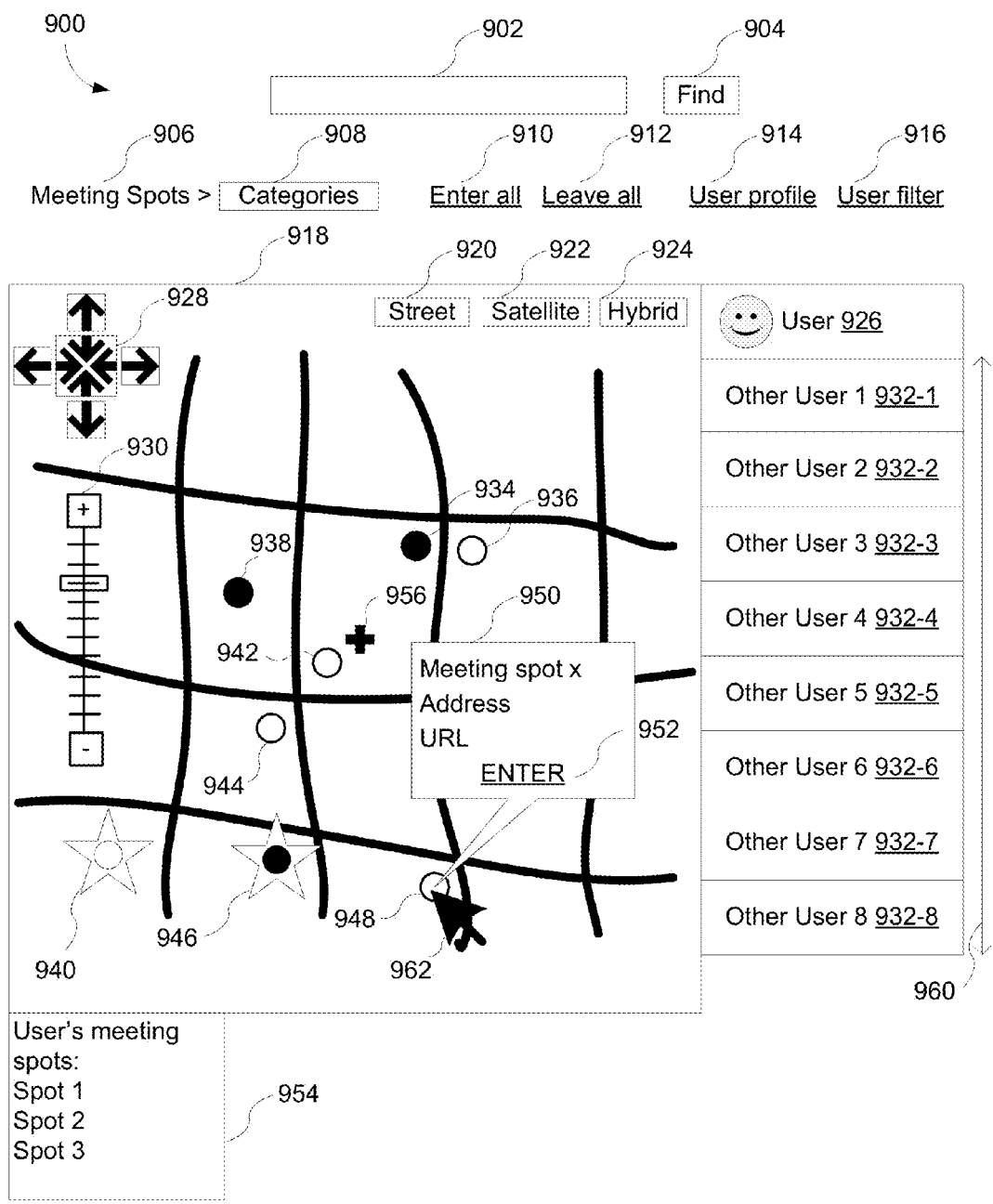
FIG. 9 is a schematic screen shot of an exemplary graphical user interface of a map with user-selectable meeting spots in accordance with some embodiments.

FIG. 9 is a schematic screen shot of an exemplary graphical user interface 900 of a map with user-selectable meeting spots in accordance with some embodiments. In some embodiments, GUI 900 includes the following elements, or a subset or superset thereof:

Search input box 902 for entering location information or other search query keywords;
Search initiation icon 904;
Meeting spots classifier icon 906 that, when clicked, allows a user to remove a selected category filter 908 so that more meeting spot icons are displayed;
Meeting spots categories filter 908 that lets a user choose the types of meeting spots displayed;
"Enter all" link 910 that lets a user select all of the meeting spots on the map 918;
"Leave all" link 912 that lets a user deselect all of the meeting spots in the map 918;
User profile link 914 that lets a user see and edit his or her profile 508;
User filter 916 that lets a user filter other users with whom interaction is desired (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat"));
Map 918, which shows a drawing, diagram, and/or picture (e.g., a satellite photograph) of a geographic area;
Street view icon 920 for choosing a street view in map 918;
Satellite view icon 922 for choosing a satellite view in map 918;
Hybrid view icon 924 for choosing a hybrid view of both street names and satellite images in map 918;
User icon 926 that displays information about the user (e.g., a thumbnail image or other icon that represents the user in online communications);
Pan controls 928 that move the area shown on map 918;
Zoom control 930 that changes the scale/magnification of map 918;
Icons 932 that display information (e.g., screen names and/or thumbnail images) about other users that have also selected two or more of the meeting spots selected by the computer user. (In some embodiments, the icons for other users are displayed in a list 960. In some embodiments, icons 932 display information about other users that have also selected one or more of the meeting spots selected by the computer user);
Meeting spot icons 934-948, which may have different types of status indicators, such as: clear icons (936, 942, 944, and 948) for meeting spots that the user has not entered or selected; dark icons (934, 938, 946) for meeting spots that the user has entered or selected; and starred icons (940, 946) for meeting spots that the user has tagged as favorites. (Alternatively, different colors can be used to represent different status, such as green icons for entered meeting spots and red icons for not entered meetings spots);
Box 950 that displays additional information about a meeting spot (e.g., when cursor 962 hovers over or clicks on a meeting spot icon (e.g., 948)) and/or permits additional user actions with respect to the meeting spot, such as entering or selecting the meeting spot by selecting link 952;
Location icon 956 that marks the location specified by the user in search box 902; and
List of user's meeting spots 954 that can be a list of meeting spots that the user has currently entered, a list of meeting spots tagged by the user, a list of meeting spots that the user has currently or recently visited in the physical world (e.g., as determined by GPS tracking of the user's cell phone or other client 104).

As noted above, in some embodiments, the graphical user interface 900 may contain a subset of the features or items shown in FIG. 9. Furthermore, in some embodiments, the graphical user interface 900 may include other features or items not shown in FIG. 9.

Referring to FIGS. 8A and 8B, client 104 sends (802) location information to server 102. In some embodiments, the location information is specified by a user inputting the location information into client 104 (e.g., by the user inputting the location information into search box 902 and activating search initiation icon 904). The location information may concern the current location of the user, a potential future location of the user, or any other location chosen by the user. In some embodiments, the location information is all or part of a mailing address. In some embodiments, the location information is a zip code. In some embodiments, the location information is the position of client 104, e.g., as determined by the client 104 using GPS module 322. In yet other embodiments, the client 104 sends an IP address of the client to the server 104, which associates location information with the client's IP address. In many cases, the IP address of the client is sufficient to identify the city or zip code of the client 104, and in some cases the IP address of the client may be sufficient to identify a specific building or set of buildings (e.g., a corporate or school campus). In some embodiments, for safety and privacy, no information about the location of client 104 is sent to the server 102 without the knowledge and/or permission of the user. In such embodiments, the user can prevent the server 102 (and other users) from knowing the user's physical location.

Server 102 receives (804) the location information sent by client 104.

Server 102 identifies (806) meeting spots that satisfy one or more parameters. In some embodiments, the one or more parameters include a physical distance, or an estimated driving time relative to the location specified by the location information. In some embodiments, the one or more parameters include a type of meeting spot, such as a dining location, an exercising location, a partying location, a playing location, a shopping location, or a watching location. In some embodiments, the one or more parameters include a type of meeting spot and either a physical distance or an estimated driving time relative to the location specified by the location information. In some embodiments, the one or more parameters are keywords in a search query. In some embodiments, at least some of the parameters are selected by the user at client 104. For example, the user may select the type of meeting spot using category filter 908.

Server 102 sends (808) and client 104 receives (810) data representing the identified meeting spots. In some embodiments, the identified meeting spots are displayed in a map in a GUI (e.g., meeting spots 934-948 in map 918 in GUI 900). In some embodiments, the icons 934-948 representing meeting spots are within a predetermined distance or estimated driving time from a location on the map specified by the computer user. In some embodiments, the map is a street map, a satellite photograph, or a hybrid map showing street names superimposed on a satellite photograph.

Client 104 receives (812) user selections for a plurality of meeting spots. In some embodiments, the user selects the plurality of meeting spots using a map-based GUI (e.g., 900). In some embodiments, selection of a meeting spot icon is accomplished by the user clicking cursor 960 on the icon. In some embodiments, selection of a meeting spot icon is accomplished by the user hovering cursor 960 over the icon, which results in the display of more information 950 about the meeting spot and a link (e.g., ENTER link 952) that the user can activate to select the corresponding meeting spot.

Client 104 sends (814) and server 102 receives (816) user-chosen meeting spot data that correspond to the plurality of meeting spots selected by the user.

In some embodiments, server 102 creates (818) a meeting-spot-based user interest profile for the user based at least in part on the plurality of meeting spots selected by the user. In some embodiments, the meeting-spot-based user interest profile for the user is created in real-time, i.e., the profile is generated and updated as the user selects meeting spots. In some embodiments, the meeting-spot-based user interest profile for the user is stored, e.g., in interest profile 508 in user record 246. In some embodiments, interest profile 508 is a list of meeting spots selected by the user. In some embodiment, interest profile 508 is a list of meeting spots selected by the user and one or more attributes concerning the user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat").

In some embodiments, server 102 determines (820) similarity scores between the user and other users that have also selected two or more of the meeting spots selected by the user, wherein the similarity scores are based at least in part on the overlap in meeting-spot-based user interest profiles for the user and for the other users. In some embodiments, server 102 determines similarity scores between the user and other users that have also selected one or more of the meeting spots selected by the user. In some embodiments, the similarity score is the number of overlapping meeting spots that both users have presently entered. In some embodiments, the similarity score is the number of overlapping meeting spots that both users have presently entered divided by the total number of meeting spots that both users have presently entered. In some embodiments, the similarity score is the number of overlapping meeting spots that both users have tagged. In some embodiments, the similarity score is the number of overlapping meeting spots that both users have tagged divided by the total number of meeting spots that both users have tagged. In some embodiments, the similarity score is a combination of one of the preceding scores with a score based on the overlap in attributes of the user and the other user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat").

Server 102 sends (822) and client 102 receives (824) and displays (826) information (e.g., icons 932) concerning at least some of the other users for display. In some embodiments, the display of the information 932 concerning the other users depends at least in part on the similarity scores between the user and the other users. In some embodiments, users with higher similarity scores are displayed higher (i.e., at higher display positions) than users with lower similarity scores in a list 960 of other users. In some embodiments, the similarity scores of the other users and the order in which the other users 932 are displayed in list 960 changes in real time as the user changes the meeting spots that he or she has selected (e.g., by entering or leaving meetings spots). In some embodiments, GUI icons associated with users with higher similarity scores are displayed more prominently than GUI icons associated with users with lower similarity scores. In some embodiments, GUI icons differentiate users based at least in part on the users' similarity scores.

In some embodiments, the information about other users is filtered (e.g., via user filter 916) so that only information about other users with whom interaction is desired is displayed (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")). In such embodiments, the "in bound" information about other users is filtered.

Conversely, in some embodiments, a user can filter the "out bound" information concerning the user (e.g., via a filter analogous to user filter 916), thereby enabling the user to control: (1) which other users are permitted to view the user's information (e.g., show the user's information only to other users in the user's contact list 512; show the user's information to anybody, including strangers; or show the user's information to other users whose profiles satisfy one or more criteria) and (2) what information about the user is communicated (e.g., the user's screen name or other contact information 510, a thumbnail image, and/or one or more user attributes in user profile 508).

In some embodiments, a user can filter or control both the "out bound" information concerning the user and the "in bound" information concerning other users.

In some embodiments, client 104 receives (828) a request from the user to initiate an online discussion or communication with one of the other users. In some embodiments, selecting an icon 932 representing another computer user initiates an online communication with the computer user represented by the selected icon 932. In some embodiments, the online communication includes instant messaging, voice communications (e.g., using VoIP), and/or video chat. In some embodiments, the user may request to initiate online communications with two or more of the other users, in effect requesting the formation of a multi-user chat room or multi-user communication.

Figure 10:
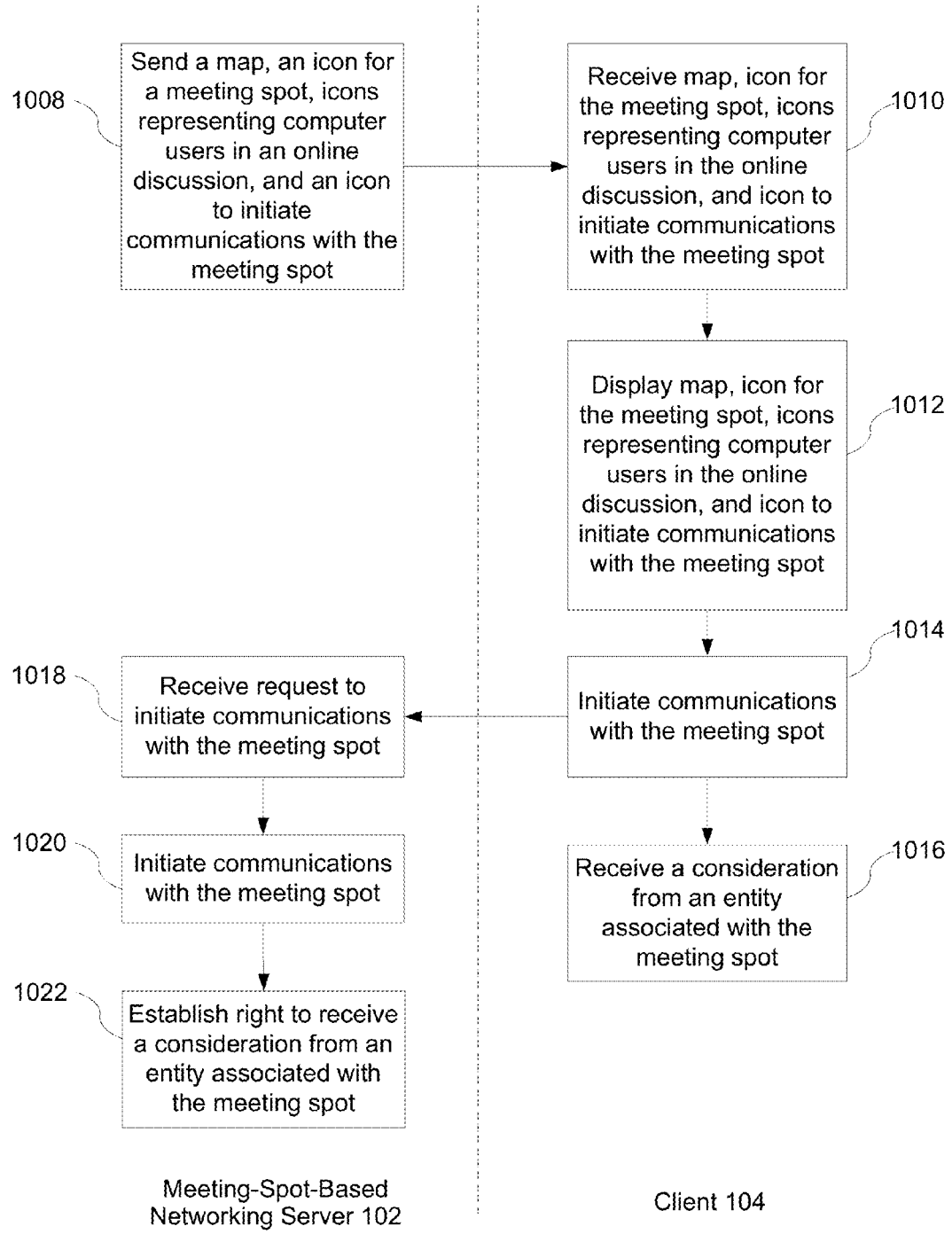
FIG. 10 is a flowchart representing a method of identifying meeting spots and communicating with meeting spots in accordance with some embodiments.
Figure 11:
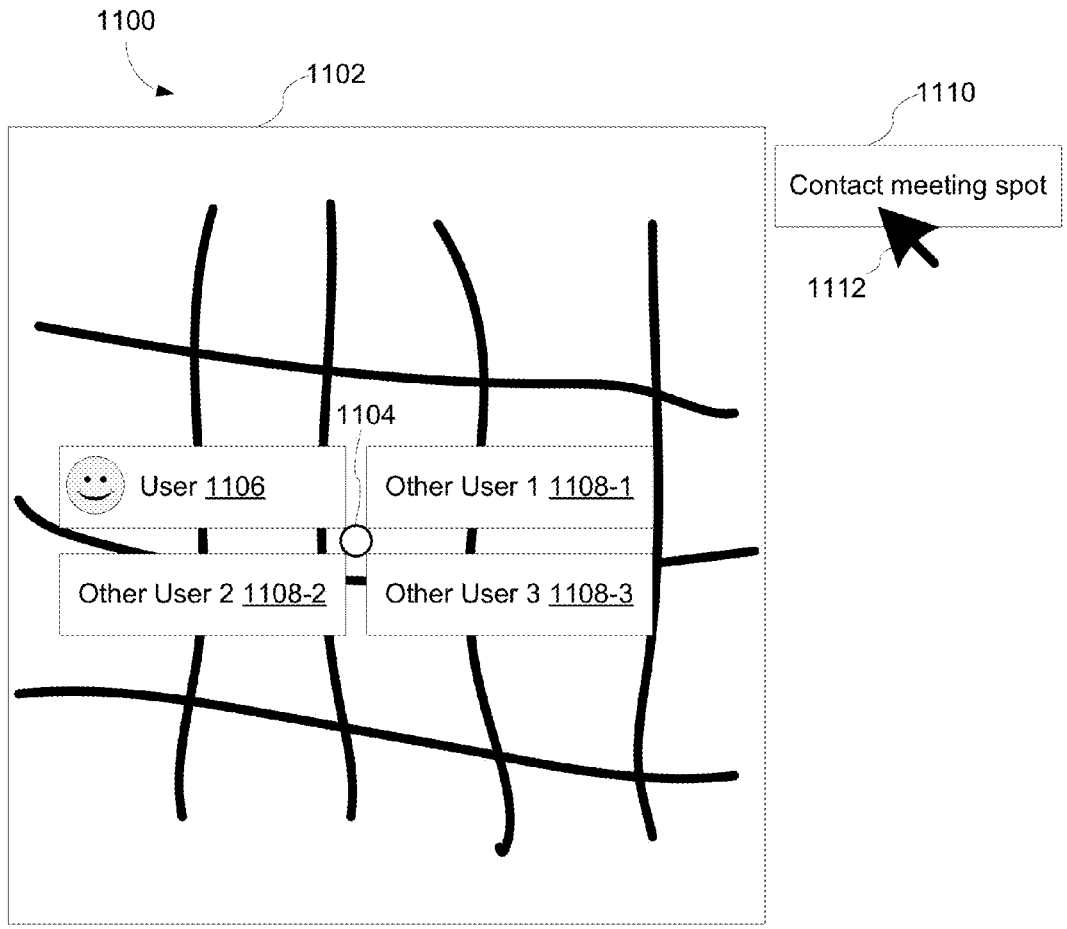
FIG. 11 is a schematic screen shot of an exemplary graphical user interface of a map with user-selectable meeting spots in accordance with some embodiments.

FIG. 10 is a flowchart representing a method of identifying meeting spots and communicating with meeting spots in accordance with some embodiments. FIG. 10 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIG. 11 is a schematic screen shot of an exemplary graphical user interface of a map with user-selectable meeting spots in accordance with some embodiments.

Server 102 sends (1008) to a plurality of client devices associated with computer users in an online discussion information corresponding to: a map 1102, an icon for a meeting spot to be overlaid on the map 1104, a plurality of icons representing at least some of the computer users in the online discussion (e.g., 1106, 1108-1, 1108-2, and 1108-3), and an icon 1110 to initiate online communications between a respective client device and a computer associated with the meeting spot. In some embodiments, the icon for the meeting spot 1104 is also the icon to initiate online communications 1110. The information corresponding to map 1102 and the various icons may be sent using a single data structure or multiple data structures that are merged for display at the client 104. In some embodiments, the information sent that corresponds to map 1102 and the various icons contains all of the data needed to display the map 1102 and the various icons in GUI 1100 on client 104. In some embodiments, the information sent that corresponds to map 1102 and/or the various icons include pointers to data stored in client 104. The pointers in combination with the data stored in client 104 can be used to display the map 1102 and the various icons in GUI 1100 on client 104.

Client 104 receives (1010) and displays (1012) the map 1102, the icon for the meeting spot 1104, the plurality of icons representing computer users (e.g., 1106, 1108-1, 1108-2, and 1108-3), and the icon 1110 to initiate online communications with the meeting spot. In some embodiments, the map 1102, the icon for the meeting spot 1104, the plurality of icons representing computer users (e.g., 1106, 1108-1, 1108-2, and 1108-3), and the icon 1110 to initiate online communications with the meeting spot are displayed in a single application window (e.g., a browser window). In some embodiments, the plurality of icons representing computer users (e.g., 1106, 1108-1, 1108-2, and 1108-3) are fully or partially overlaid on the map 1102.

Client 104 initiates (1014) online communications with the computer associated with the meeting spot in response to the computer user selecting a corresponding icon (e.g., by the user clicking on icon 1110 with cursor 1112).

In some embodiments, client 104 receives (1016) a consideration from an entity associated with the meeting spot. In some embodiments, the consideration is a discount coupon, credit coupon, or membership card. In some embodiments, the entity associated with the meeting spot is the computer associated with the meeting spot.

In some embodiments, server 102 receives (1018) a request to initiate online communications between the computer associated with the meeting spot and at least one client 104 in the online discussion.

In some embodiments, server 102 initiates (1020) online communications between the computer associated with the meeting spot and at least one client 104 in the online discussion.

In some embodiments, server 102 establishes (1022) a right to receive a consideration from an entity associated with the meeting spot. In some embodiments, the consideration is a referral fee or a commission. Establishing a right to receive consideration may be accomplished, for example, by posting an entry to an account that will reconciled or otherwise processed at a later time. In some embodiments, the entity associated with the meeting spot is the computer associated with the meeting spot. In some embodiments, the server 102 receives the aforementioned consideration (i.e., participates in a funds transfer, in real time) instead of establishing a right to receive that consideration at 1022.

Figure 12:
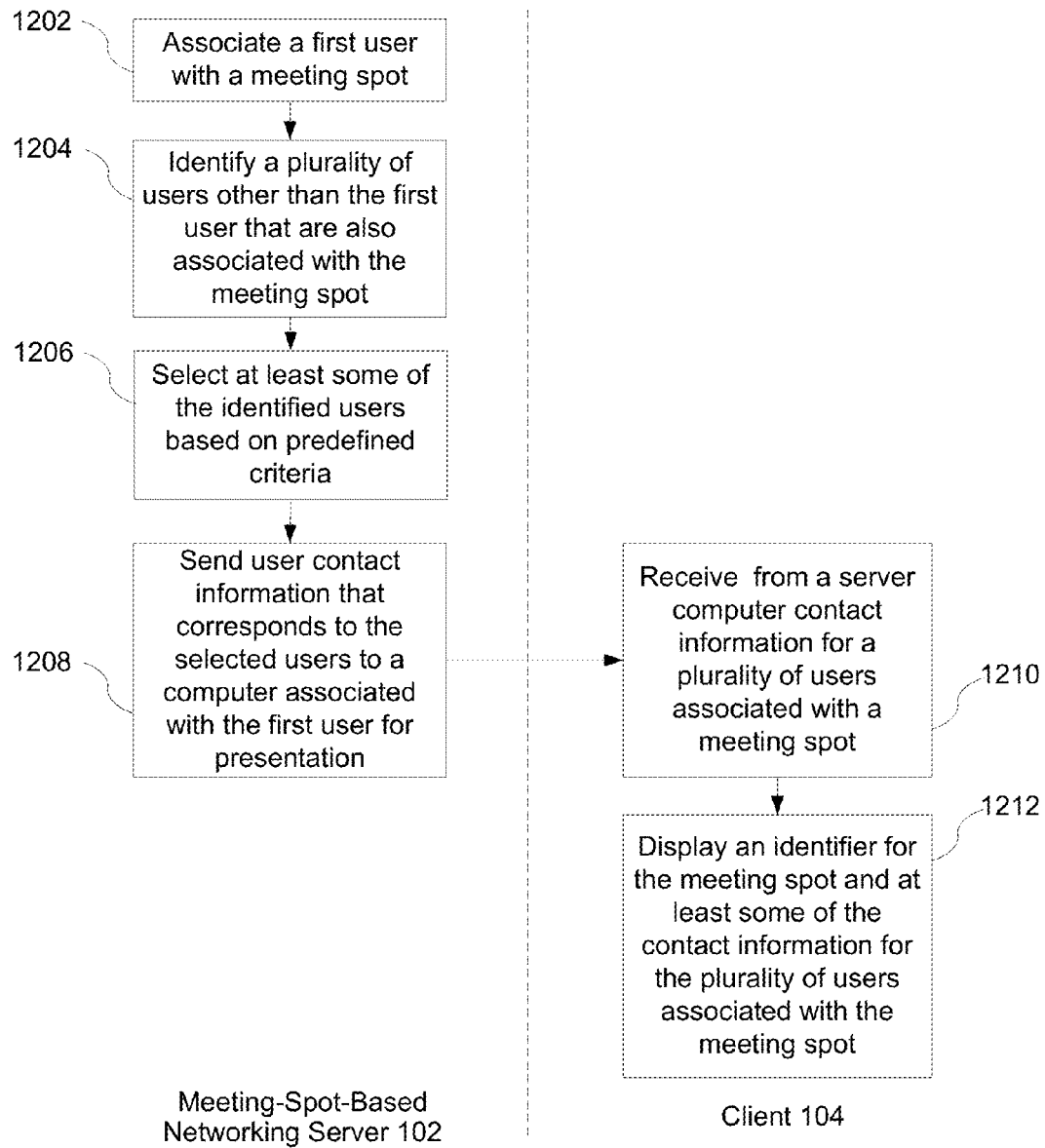
FIG. 12 is a flowchart representing a method of generating meeting-spot-related contact lists in accordance with some embodiments.

FIG. 12 is a flowchart representing a process or method, performed by server 102 and client 104, of generating meeting-spot-related contact lists in accordance with some embodiments. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104 or by messaging server(s) 118.

A first user is associated (1202) with a meeting spot. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

The process identifies a plurality of users other than the first user (1204) who are also associated with the meeting spot. In some embodiments, the plurality of users are identified by respective identifiers for the meeting spot 402 in respective records 240 for the plurality of users. For example, the meeting spot ID 402 may be included in the respective records 240 for the plurality of users in the entered meeting spots 504 and/or the tagged meeting spots 506. In some embodiments, the plurality of users are identified via the user IDs listed in field 418 of the meeting spot record 228.

At least some of the identified users are selected (1206) based on predefined criteria. In some embodiments, the predefined criteria include that the identified user is currently online. In some embodiments, the predefined criteria include that the identified user is active. In some embodiments, the identified user must satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")).

User contact information that corresponds to the selected users is sent (1208) to a client device 104 associated with the first user for presentation. In some embodiments, the user contact information is sent for display in a list, e.g., other user information 932 in list 960. In some embodiments, the user contact information is sent for display in a contact list 1302 of the first user.

A client device 104 may be permanently associated with the first user (e.g., by a telephone number or IP address) or the client device 104 may be intermittently associated with the first user (e.g., by the user logging in and out of a communications application (e.g., 314, 316, or 318) on the client device 104).

The client device 104 associated with the first user receives (1210) from a server computer contact information for a plurality of users associated with a meeting spot. In some embodiments, as described above, the first user is also associated with the meeting spot.

The client device 104 associated with the first user displays (1212) an identifier 1304 for the meeting spot and at least some of the contact information for the plurality of users associated with the meeting spot. In some embodiments, the identifier 1304 and the at least some contact information is displayed in a contact list 1302 of the first user.

Figure 13A:
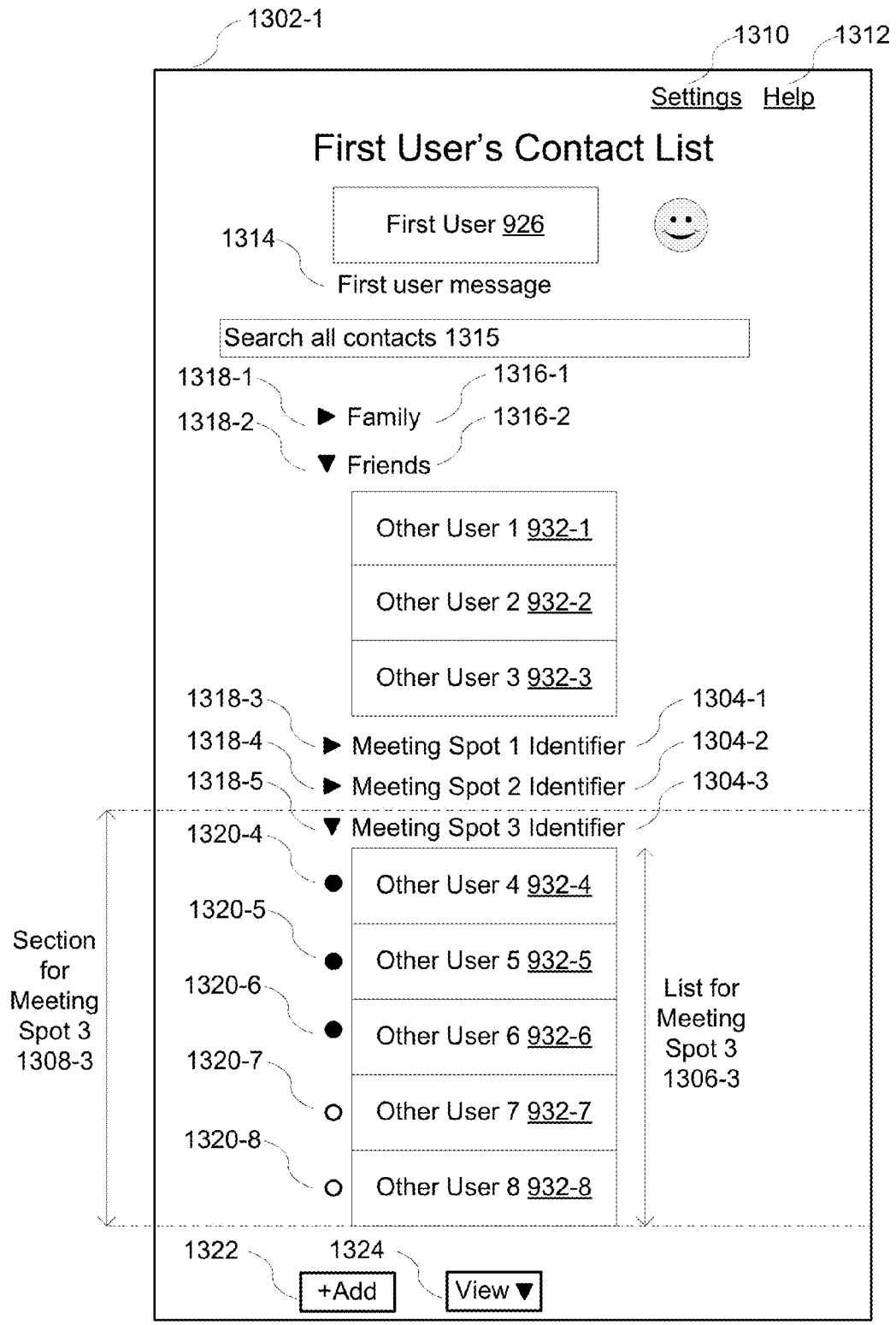
FIGS. 13A-13C are schematic screen shots of exemplary graphical user interfaces that include meeting-spot-related contact lists in accordance with some embodiments.
Figure 13B:
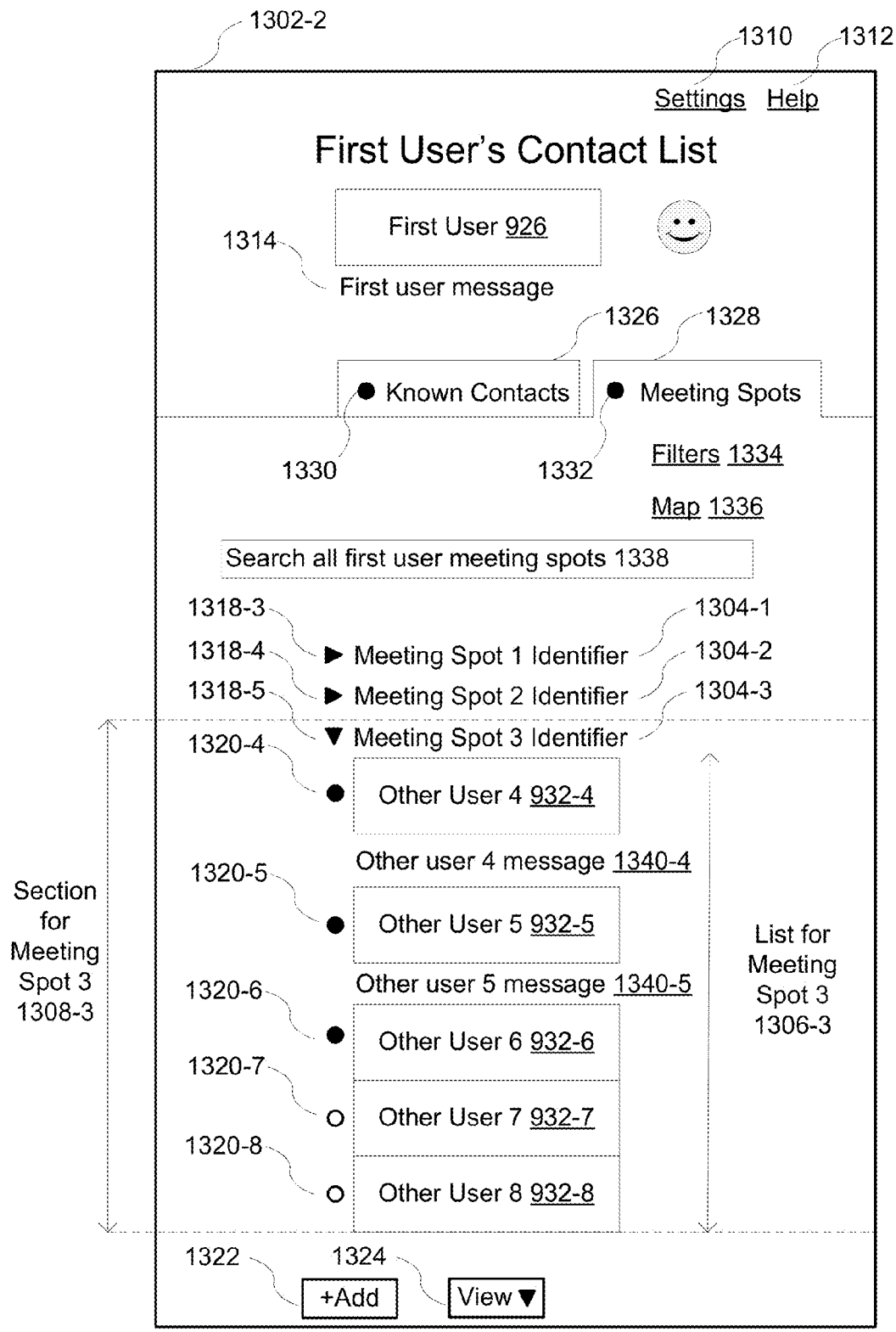
Figure 13C:
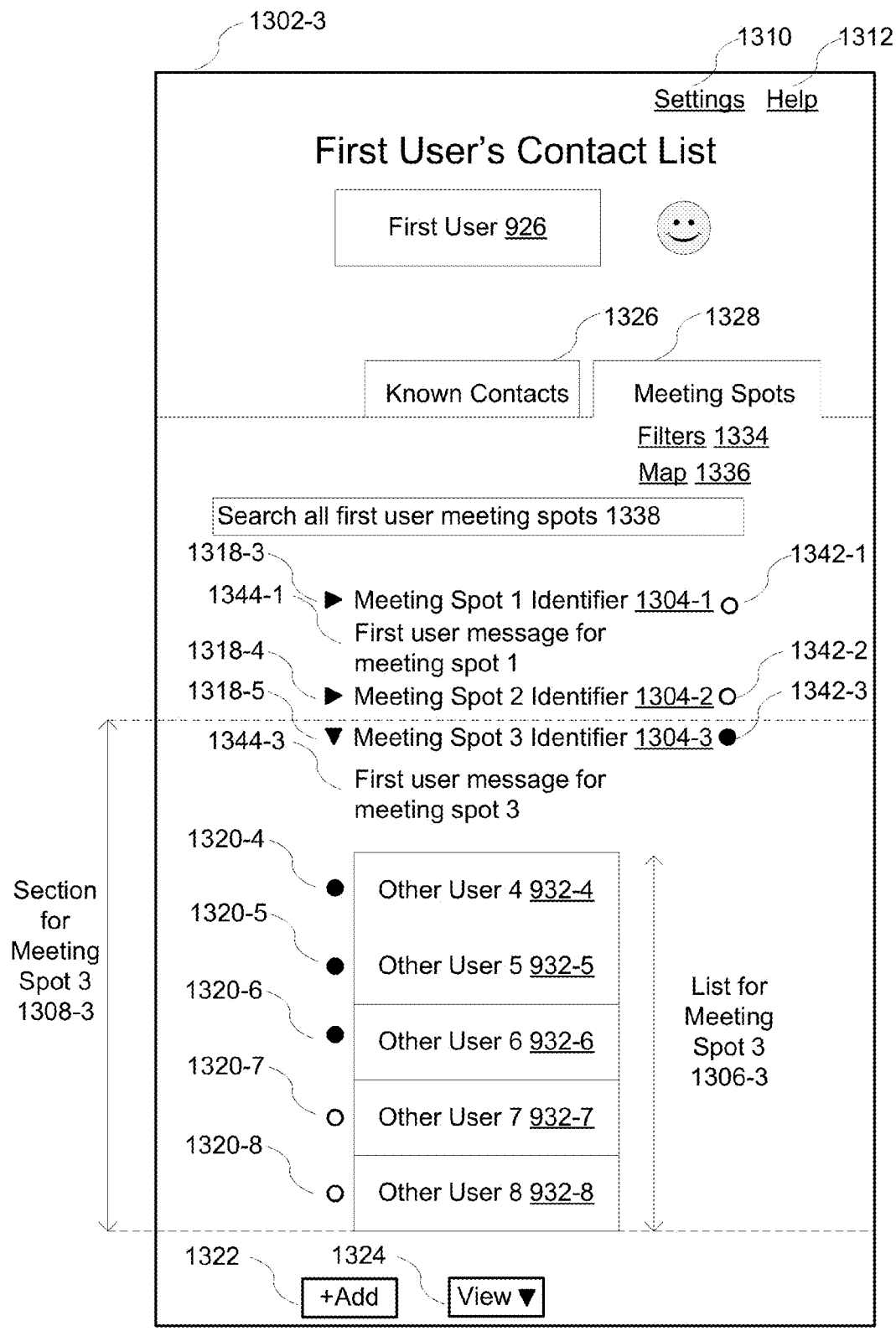

FIGS. 13A-13C are schematic screen shots of exemplary graphical user interfaces (GUIs) that include meeting-spot-related contact lists 1302 in accordance with some embodiments.

In some embodiments, such GUIs include the following elements, or a subset or superset thereof:

First user information icon 926 that displays information about the first user, such as contact information, that may be displayed to other users' (e.g., in list 960 or contact list 1302)

Other user information icons 932 that display information, such as screen names and other contact information, about other users. (In some embodiments, the icons 932 for other users are links that initiate online communications with the corresponding other users);

Meeting spot identifier(s) 1304, such as a name or logo for a meeting spot;

List(s) 1306 of contact information about other users 932 that are associated with corresponding meeting spot(s);

Section(s) 1308 of contact list 1302 that, for a given meeting spot, includes the list 1306 of contact information about other users 932 that are associated with the meeting spot and a section heading that includes the meeting spot identifier 1304;

Settings icon 1310 that links the user to user preferences;

Help icon 1312 that links to information for setting up, maintaining, and using a contact list 1302;

First user message 1314 that shows a message that may appear in other users' contact lists 1302 that include contact information 926 for the first user;

Search box 1315 for entering search terms to search for in the user's contact list 1302;

Identifiers 1316 for other sections of contact list 1302 besides meeting spot sections 1308, such as family 1316-1 and friends 1316-2;

Expand/collapse icons 1318 for expanding and collapsing sections of contact list 1302 (e.g., in FIG. 13A, the sections corresponding to 1318-1, 1318-3, and 1318-4 are collapsed and the sections corresponding to 1318-2, and 1318-5 are expanded);

Online status icons 1320 that indicate (e.g., by icon shape, color, and/or filling) the availability of the corresponding user for online communications;

Add icon 1322 for adding new sections and/or users to the contact list 1302;

View icon 1324 for selecting what and/or how information is shown in list 1302 (e.g., show one page, sort by name, show pictures, show offline friends, etc.);

Tab 1326 (FIGS. 13B, 13C) that activates, when selected, display of portions of the contact list 1302 that are not concerned with meeting spots;

Meeting spot tab 1328 (FIGS. 13B, 13C) that activates, when selected, display of portions of the contact list 1302 that are concerned with meeting spots (e.g., 1304, 1306, and/or 1308);

Online status icon 1330 that indicates (e.g., by icon shape, color, and/or filling) whether any of the users in the portions of the contact list 1302 corresponding to tab 1326 are available for online communications;

Online status icon 1332 that indicates (e.g., by icon shape, color, and/or filling) whether any of the users in the portions of the contact list 1302 corresponding to tab 1328 are available for online communications;

Filters icon 1334 that links to a screen that enables a user to select what inbound and/or outbound filters are applied to the display of other users information 932 in one or more meeting spot sections 1308 in contact list 1302;

Map icon 1336 that links to a map (e.g., 918) that displays meeting spots (e.g., at least some of the meeting spots associated with the first user) and/or permits a user to add meeting spots;

Search box 1338 for entering search terms to search for in meeting spots associated with the first user, including other user information associated with such meeting spots;

Messages from other users 1340 that are analogous to first user message 1314;

Online status icon(s) 1342 that indicates (e.g., by icon shape, color, and/or filling) whether any of the other users associated with a given meeting spot are available for online communications; and First user message 1344 that shows a message that may appear in other users' contact lists 1302 that include the same meeting spot;

Note that first user message 1314 is a global message that may be displayed in other users' contact lists (e.g., "I'm back in town."), whereas first user message 1344 is a message from the first user that may be displayed to other users of a particular meeting spot (e.g., "I'll be at meeting spot 3 tonight at 8 PM.")

As noted above, in some embodiments, graphical user interfaces that include meeting-spot-related contact lists 1302 may contain a subset of the features or items shown in FIGS. 13A-13C. Furthermore, in some embodiments, such graphical user interfaces may include other features or items not shown in FIGS. 13A-13C.

Graphical user interfaces (e.g., on client 104) include: a contact list 1302 for a first user; in the contact list 1302, an identifier 1304 for a meeting spot; and a list 1306 of contact in formation for a plurality of users that are associated with the meeting spot.

In some embodiments, identifier 1304 is a name or logo for the meeting spot.

In some embodiments, the contact list 1302 is divided into sections 1308 and the list of contact information 1306 is included in a section having a section heading comprising the identifier for the meeting spot 1304. In some embodiments, the list 1306 of contact information is adjacent to the identifier 1304 for the meeting spot.

In some embodiments, the list 1306 of contact information includes links for the plurality of users. In some embodiments, activation of a link for a particular user initiates online communications with the particular user.

In some embodiments, the meeting spot is associated with the first user, e.g., by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon (e.g., 934-948) corresponding to the meeting spot. In some embodiments, the icon corresponding to the meeting spot is displayed on a digital map (e.g., 918).

In some embodiments, the meeting spot is associated with the plurality of users by respective identifiers for the meeting spot 402 in respective records 240 for the plurality of users. For example, the meeting spot ID 402 may be included in the respective records 240 for the plurality of users, in the entered meeting spots 504 and/or the tagged meeting spots 506. In some embodiments, the meeting spot is associated with the plurality of users by respective user IDs for the plurality of users in field 418 of the meeting spot record 228.

Figure 14:
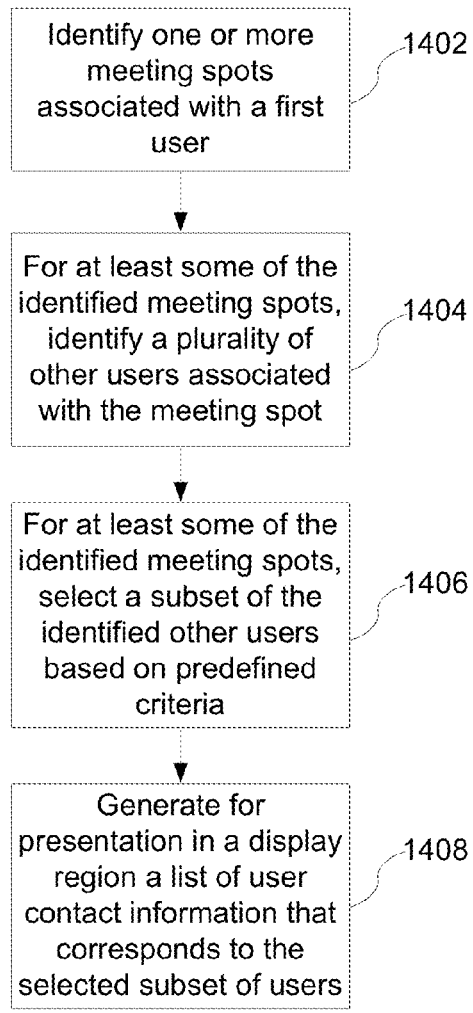
FIG. 14 is a flowchart representing a method of generating meeting-spot-related contact lists in accordance with some embodiments.

FIG. 14 is a flowchart representing a method of generating meeting-spot-related contact lists in accordance with some embodiments. The method may be performed entirely by server 102; entirely by client 104; or by server 102 in part, and by client 104 in part. Alternately, the method may be performed, at least in part, by messaging servers 118. It will be appreciated by those of ordinary skill in the art that one or more of the acts described may be performed by hardware, software, or a combination thereof, as may be embodied in one or more computing systems.

One or more meeting spots associated with a first user are identified (1402). In some embodiments, at least two meeting spots are identified. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

For at least some of the identified meeting spots, a plurality of other users associated with the meeting spot are identified (1404). In some embodiments, the plurality of users are identified by respective identifiers for the meeting spot in respective records 240 for the plurality of users. For example, the meeting spot ID 402 may be included in the respective records 240 for the plurality of users who have "entered" or tagged the corresponding meeting spot 228. In some embodiments, the plurality of users are identified via the user IDs listed in field 418 of the meeting spot record 228.

For at least some of the identified meeting spots, a subset of the identified other users based on predefined criteria is selected (1406). In some embodiments, the predefined criteria include that the identified user is currently online. In some embodiments, the predefined criteria include that the identified user is active. In some embodiments, the identified user must satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")).

A list of user contact information that corresponds to the selected subset of users is generated (1408) for presentation in a display region (e.g., list 1306).

Figure 15:
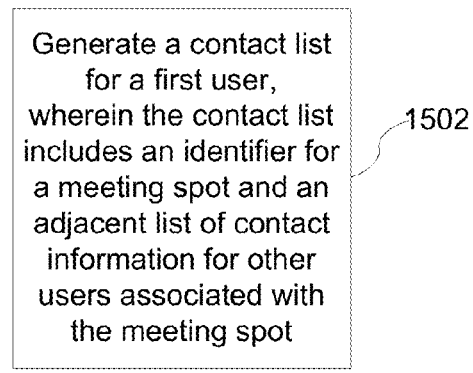
FIG. 15 is a flowchart representing a method of generating meeting-spot-related contact lists in accordance with some embodiments.

FIG. 15 is a flowchart representing a method of generating meeting-spot-related contact lists in accordance with some embodiments. In some embodiments, the method is performed by a client device associated with the first user. In some embodiments, the method is performed by a server computer remote from a client device associated with the first user. The method may be performed entirely by server 102; entirely by client 104; or by server 102 in part, and by client 104 in part. Alternately, the method may be performed, at least in part, by messaging servers 118. It will be appreciated by those of ordinary skill in the art that one or more of the acts described may be performed by hardware, software, or a combination thereof, as may be embodied in one or more computing systems.

A contact list 1302 for a first user is generated (1502). The contact list includes an identifier 1304 for a meeting spot and an adjacent list 1306 of contact information for other users associated with the meeting spot.

In some embodiments, the first user is also associated with the meeting spot. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

Figure 16:
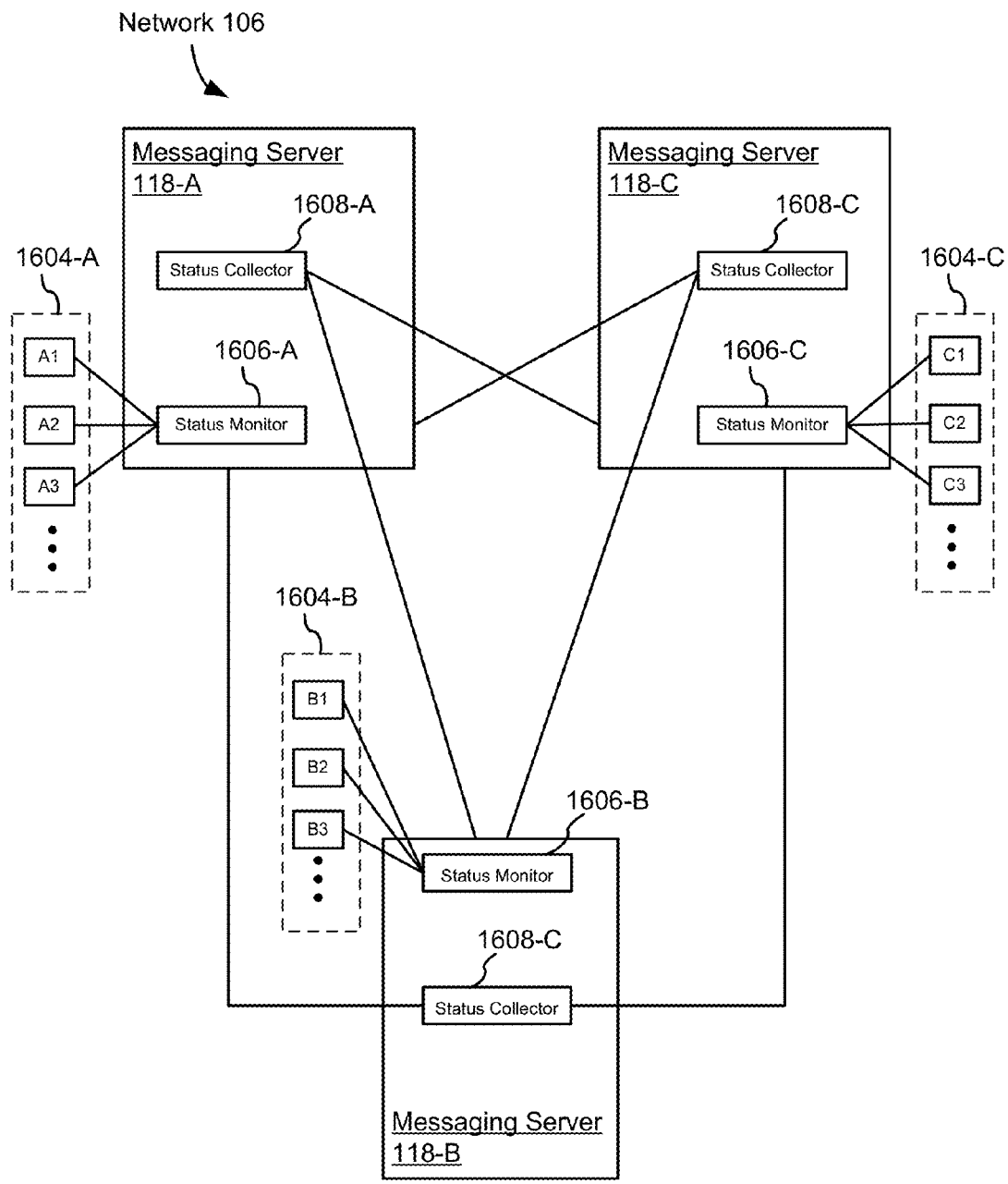
FIG. 16 is a block diagram illustrating an exemplary a network of messaging servers in accordance with embodiments of the invention.

The use of messaging servers 118 to monitor and report the status of users is now described in more detail. FIG. 16 is a block diagram illustrating an exemplary a network of messaging servers in accordance with embodiments of the invention. FIG. 16 illustrates an embodiment of a logical coupling of the messaging servers to each other and to clients for monitoring and reporting the statuses of the users on the clients. The network 106 includes messaging servers 118-A, 118-B, and 118-C. The network 106 may include more or fewer messaging servers than what is shown in FIG. 16. Each messaging server is assigned a set of one or more users. Messaging server 118-A is assigned users 1604-A. Messaging server 118-B is assigned users 1604-B. Messaging server 118-C is assigned users 1604-C. Each messaging server includes a status monitor and a status collector. Thus, messaging server 118-A includes a status monitor 1606-A and a status collector 1608-A. Messaging server 118-B includes a status monitor 1606-B and a status collector 1608-B. Messaging server 118-C includes a status monitor 1606-C and a status collector 1608-C. In some other embodiments, each of the messaging servers has one status monitor and one status collector per user that is assigned to the respective messaging server.

Whenever a user goes from offline to online (e.g., by logging in at an online communication application), the client application (e.g. text messaging module 314, audio module 316, or video module 318) sends a message to the network 106 announcing that it is online. In some embodiments, this message is routed to the messaging server assigned to the user, and the other messaging servers will not receive this message directly because it came from a user not assigned to them. The status monitor 1606 at the messaging server to which the user is assigned receives the message and changes the status of that user to "online" (or "active," "busy," or whatever status is appropriate). Furthermore, the status collector 1608 at the messaging server gathers the statuses of the contacts in that user's contact list. While some of the contacts in the user's contact list may be assigned to the same messaging server, other contacts in the user's contact list are assigned to other messaging servers. The status collector 1608 of the messaging server 118 assigned to the user gathers the statuses of the user's contacts, including those assigned to other messaging servers, and forwards at least a portion of the collected status information to the user. In some embodiments, the status collector 1608 broadcasts requests for status information of the contacts to the network and the messaging servers 118 to which the contacts are assigned respond to the requests. In some other embodiments, the status collector 1608 determines the messaging servers 118 to which the contacts are assigned and sends requests for status information to those messaging servers. In some embodiments, the contact assignments may be determined by reference to an index of all users, a copy of which may be stored in all of the messaging servers or a subset thereof, and their messaging server assignments.

For example, if a user A1 of users 1604-A, assigned to messaging server 118-A, goes from offline to online, the client application associated with the user A1 sends a message to the network 106 announcing that user A1 is online. The status monitor 1606-A at the messaging server 118-A receives the message (the other messaging servers 118-B and 118-C will not receive it) and updates the status of the user A1 to online. The status collector 1608-A at the messaging server 118-A obtains a list of the contacts in the user A1's contact list, for instance by accessing user A1's contact list. Using that list of contacts, the status collector 1608-A gathers status information from the messaging servers to which the contacts are assigned. Thus, if a contact is assigned to messaging server 118-A, then the status collector 1608-A accesses the contact's status information stored at messaging server 118-A. If the contact is assigned to messaging server 118-B, then it communicates with messaging server 118-B to get the status information. A similar procedure occurs if the contact is assigned to messaging server 118-C.

After user A1's online status changes (e.g., from online to offline, or vice versa), the messaging servers other than the one assigned to user A1 receive a status update for user A1 whenever their respective status collectors request the status of user A1. More specifically, if there are other users, assigned to other messaging servers, who subscribe to the online presence of user A1 and are currently online, then the status collectors of their assigned messaging servers will periodically request status updates for user A1.

Figure 17:
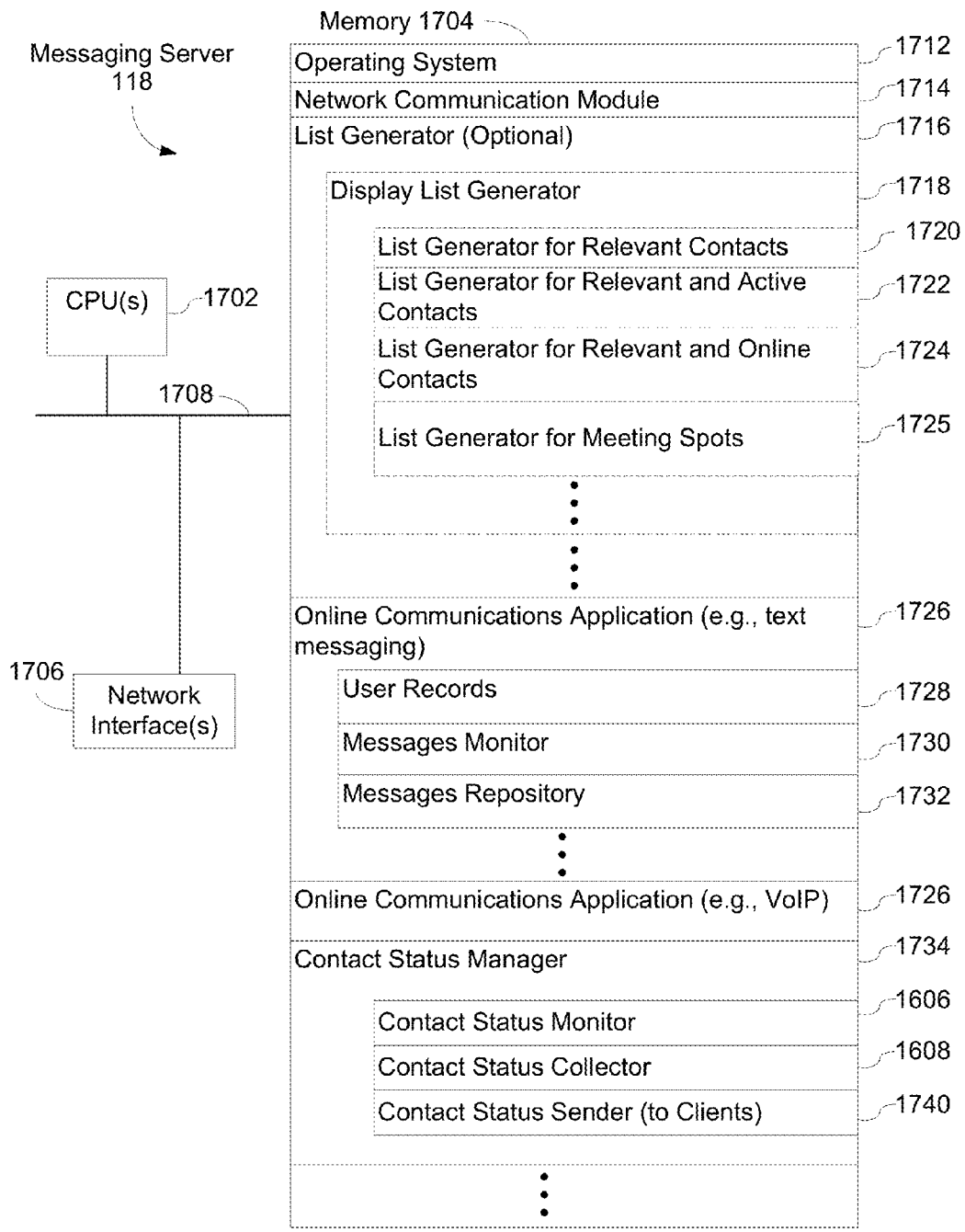
FIG. 17 is a block diagram illustrating a messaging server in accordance with some embodiments.

FIG. 17 is a block diagram illustrating a messaging server, according to some embodiments of the invention. The messaging server 118 typically includes one or more processing units (CPU's) 1702, one or more network or other communications interfaces 1706, memory 1704, and one or more communication buses 1708 for interconnecting these components. The messaging server 118 optionally may include a user interface (not shown), which may include a display device, a keyboard, and/or a mouse. Memory 1704 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1704 may optionally include one or more storage devices remotely located from the CPU(s) 1702. In some embodiments, memory 1704 stores the following programs, modules and data structures, or a subset or superset thereof:

- Operating System 1712 that includes procedures for handling various basic system services and for performing hardware dependent tasks;
- Network Communication Module (or instructions) 1714 that is used for connecting the messaging server 118 to other computers (e.g., clients 104) via the one or more communication network interfaces 1706 (wired or wireless) to one or more communication networks, such as the Internet, other wide area networks, local area networks, metropolitan area networks, and so on;
- an optional List Generator 1716 for generating lists of contacts;
- one or more online communications applications 1726, such as text messaging, audio chat, VoIP telephony, and/or video chat; and
- a Contact Status Manager 1734 for managing statuses of users.

The list generator may include a display list generator 1718, which generates lists of contacts for presentation in the display region of a client application. In some embodiments, the display list generator 1718 includes a list generator for relevant contacts 1720, a list generator for relevant and active contacts 1722, a list generator for relevant and online contacts 1724, and a list generator for meeting spots 1725. The list generator for relevant contacts 1720 generates a list of contacts that are relevant, but not necessarily active or even online at all. "Relevant," as used herein, means that the user has had interaction with the contact. Interaction may include, but is not limited to, message exchanges, scheduled meetings, transfers and/or sharing of files (such as digital images), and explicitly adding a contact to the contact list. The list of relevant contacts may be selected in accordance with a scoring function that associates a score with each contact based on the quantity, type and age of the interactions between the contact and the user. The list generator for relevant and active contacts 1722 generates a list of contacts that are relevant and "active" (or relevant and "chatty"). The list generator for relevant and online contacts 1724 generates a list of contacts that are relevant and not offline. In some embodiments, the list generator for meeting spots 1725 generates lists of other users associated with meeting spots that are also associated with a respective user for whom a list of contacts is being generated. For a given meeting spot, the list generator for meeting spots 1725 may generate a list based on predetermined criteria, such as the online status of the other users and/or matching preferences of the first user (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")). In some embodiments, the list generator may also include list generator modules for generating lists of relevant contacts who are offline and generating lists of relevant contacts who have nonempty status messages. The lists are sent to a client device for display in the display region of the client device.

The online communication application 1726 may include user records 1728, a message monitor 1730 for monitoring message traffic to and from the messaging server 118, and a messages repository 1730 for storing messages sent and received by clients. The user records 1728 include status information and contact lists of users. In some embodiments, an online communication application may include a calendar application, and interactions between a user and other contacts may include appointments or other calendar events that reference the user's contacts.

The contact status manager 1734 includes a contact status monitor 1606, a contact status collector 1608, and a contact status sender 1740. The contact status monitor 1606 receives and processes messages announcing status changes and updates status of users. The contact status collector 1608 gathers status information for contacts in a user's contact list from other messaging servers. The contact status sender 1740 sends the status information of contacts in a user's contact list to the client associated with the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1704 may store a subset of the modules and data structures identified above. Furthermore, memory 1704 may store additional modules and data structures not described above.

Although FIG. 17 shows a "messaging server," FIG. 17 is intended more as functional description of the various features which may be present in a set of servers than as a structural schematic of the embodiments described herein.

In practice, and as recognized by those of ordinary skill in the art, items shown separately could be combined and some items could be separated. For example, some items shown separately in FIG. 17 could be implemented on single servers and single items could be implemented by one or more servers. The actual number of servers used to implement a messaging server and how features are allocated among them will vary from one implementation to another, and may depend in part on the amount of data traffic that the system must handle during peak usage periods as well as during average usage periods.

Figure 18A:
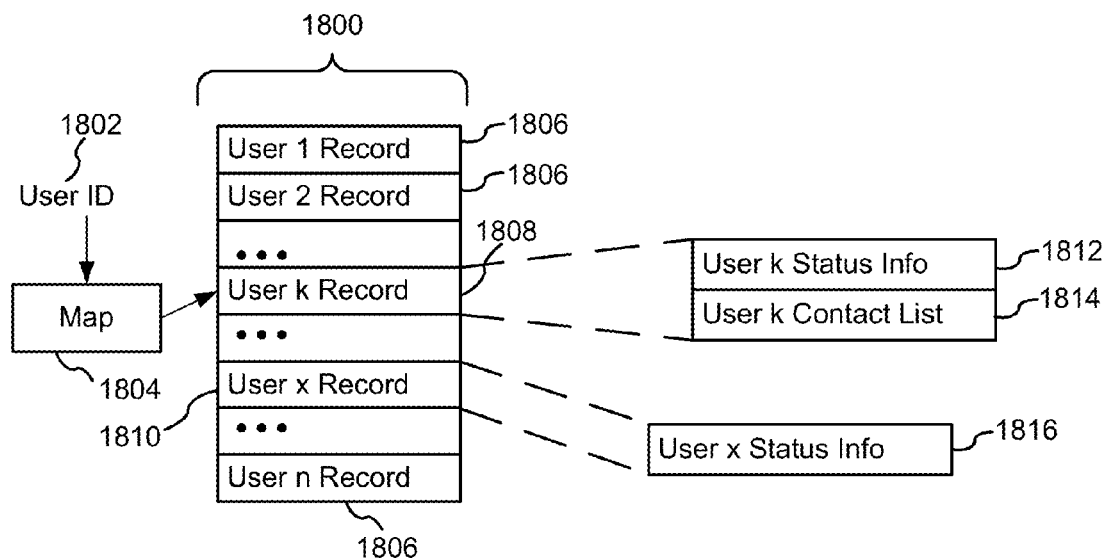
FIGS. 18A-18C are block diagrams illustrating data structures residing in a messaging server in accordance with embodiments of the invention.
Figure 18B:
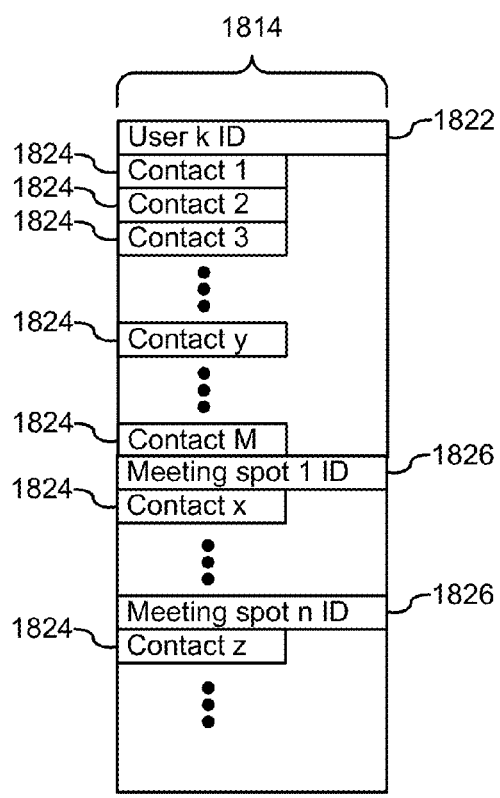
Figure 18C:
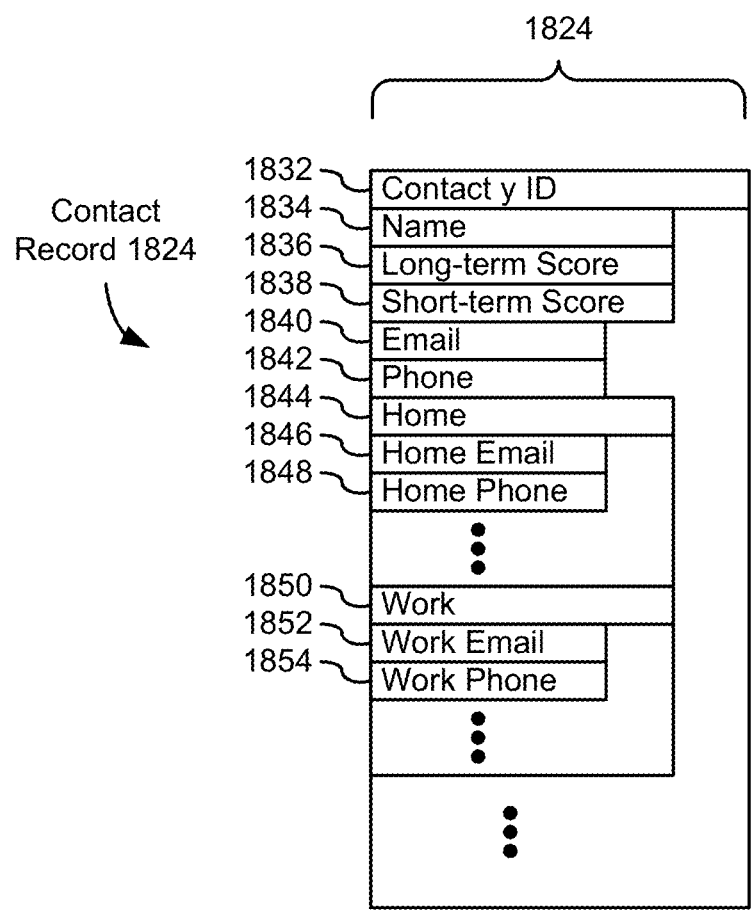

FIGS. 18A-18C are block diagrams illustrating data structures residing in a messaging server in accordance with embodiments of the invention. The messaging server stores one or more user records in a data structure 1800, as shown in FIG. 18A. Each user is associated with a unique user ID 1802. In some embodiments, the user ID is a number. In some other embodiments, the user ID is a string of characters. The string of characters may represent, for example, a username, a username and a host/domain name, or an email address.

Each user ID is associated with a user record 1806 by a map or index 1804. The messaging server includes user records for users assigned to the messaging server, such as user record 1808. The messaging server may also include user records, such as user record 1810, for users not assigned to the messaging server but which are in the contact lists of users that are assigned to the messaging server. For the user record 1808 of a user that is assigned to the messaging server, the messaging server stores that user's status information 1812 and contact list 1814. For the user record 1810 of a user who is not assigned to the messaging server, the messaging server stores that user's status information 1816. That user's contact list is stored at the messaging server to which that user is assigned.

An exemplary contact list 1814 is illustrated in FIG. 18B. It is noted that the contact list 1814 of a user record 108 in a messaging server may have a substantial amount of information that is also found in the contact list 512 of a user record 240 (FIG. 5) stored in a meeting-spot-based networking server 102. In some embodiments, the contact lists 1814 and 512 of a respective user need not be identical, while in other embodiments, the contact lists 1814 and 512 of a respective user are synchronized and therefore have the same information.

The exemplary contact list 1814, shown in FIG. 18B, includes a plurality of contact records 1824. The contact list may also include the user ID 1822 of the user, to identify the user with which the contact list is associated. The contact list may also include the meeting spot IDs 1826 of meeting spots associated with the user, to identify the meeting spots with which the contact list is associated. In some embodiments, contact information 1824 for users associated with a meeting spot in the contact list 1826 is included in the contact list 1814 (e.g., contact x for meeting spot 1 and contact z for meeting spot n in FIG. 18B). In some embodiments, meeting spot IDs 1826 serve as links to meeting spot records 228 in server 102 and the meeting spot records, in turn, include links to the contact information of users associated with the meeting spot (e.g., user IDs in field 418).

An exemplary contact record 1824 is illustrated in FIG. 18C. The contact record 1824 includes the user ID 1832 of the contact, a name of the contact 1834, an optional score 1836 sometimes called the long term score, an optional short term score 1838, an email address 1840, and a phone number 1842. The contact record may also have home contact information 1844 and work contact information 1850. The home contact information may include a home email address 1846 and a home phone number 1848. Similarly, the work contact information may include a work email address 1852 and a work phone number 1854. It should be appreciated, however, that additional or alternative information regarding the contact may be included in the contact record.

In some embodiments, the long term score 1836 is used in the generation of contact lists for presentation to a respective user. The long term score 1836 may be determined based on many factors. The factors may include, but is not limited to, an interaction history (e.g., one or more of the following: message (email and/or IM) exchanges, file transfers or sharing, calendar events) between the user and the contact. In some embodiments, the factors may further include degrees of separation between contacts and/or profile matching. The long term score measures the degree of relevance of a contact to the user over a prolonged period of time, with a higher score indicating higher relevance. In some embodiments, the long term score is decayed by a predefined percentage (e.g., 10%) at predefined intervals, such as monthly or weekly.

In some embodiments, only one contact interaction score 1836 is used for generating contact lists for presentation to the user. However, in some other embodiments, both the long term score 1836 and the short term score 1838 are used in the generation of contact lists for presentation. The short term score 1838 is a score based on short-term message activity from the user to the contact. The short term score is, in some embodiments, a running tally of messages sent by the user to the contact. Thus, a message sent by the user to the contact results in an increment of 1 of the short term score. Some special messages may result in an increment of more than 1 to the short term score. In some embodiments, the running tally counts only IM messages and special messages. The short term score measures the degree of relevance of a contact to the user over a short period of time up to the present moment. In some embodiments, the short term score is decayed by a predefined percentage (e.g., 10%) each day. In other embodiments, the short term score 1838 may be based a broader spectrum of interactions between the user and contact, including messages received and sent, and calendar events. In some embodiments, the short term score may be based on messages to the contact; or interactions between the user and contact, in a predefined time window, such as a week; or a predefined number (e.g., a number between 2 and 15) of days; or may be based on the time of the last interaction with the contact rather than an accumulated score over time.

Figure 19:
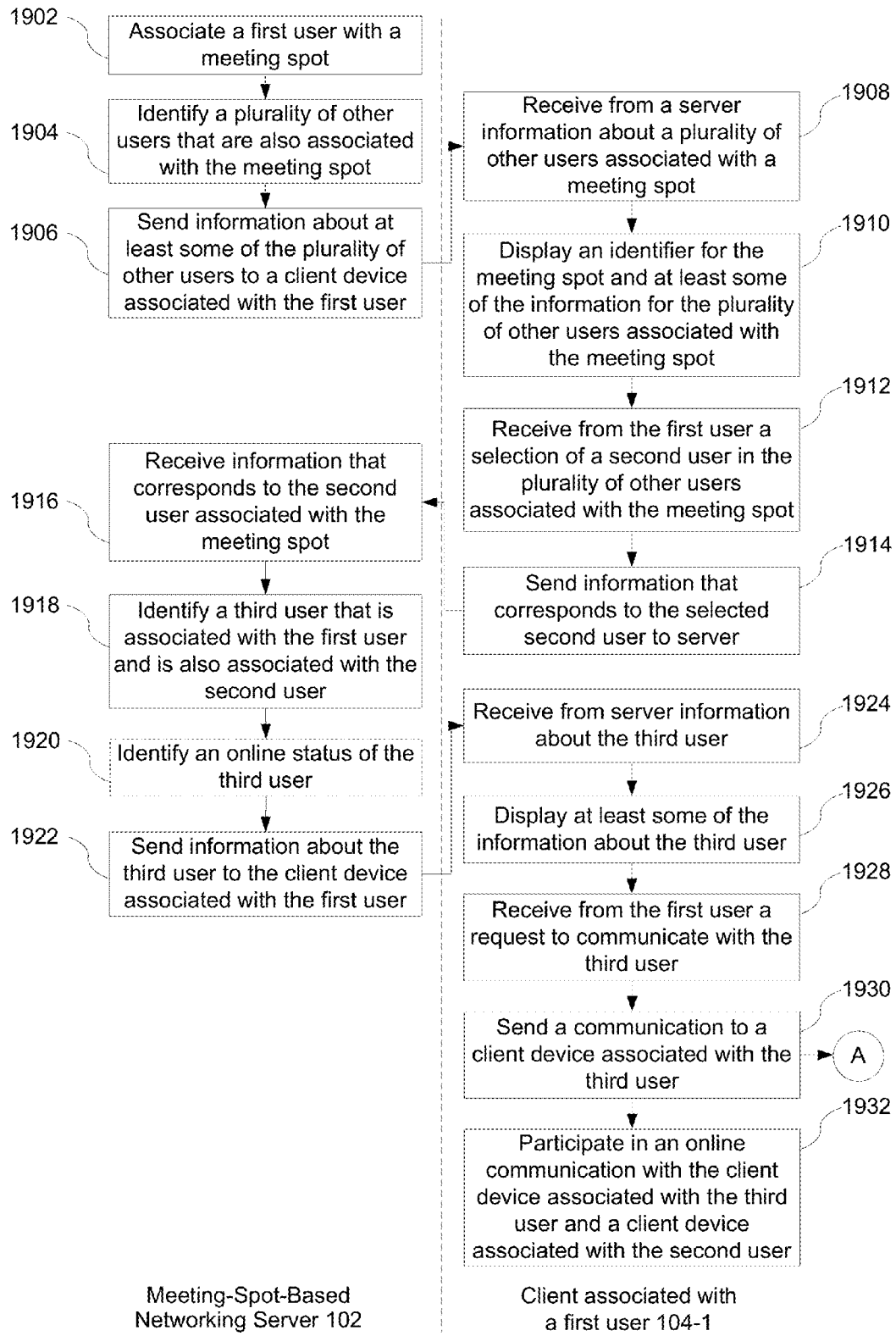
FIG. 19 is a flowchart representing a method of making an introduction via meeting-spot-related online communications in accordance with some embodiments.

FIG. 19 is a flowchart representing a method, performed by server 102 (e.g., with mapping engine 220) and client 104-1, of making an introduction via meeting-spot-related online communications in accordance with some embodiments. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104-1 or by messaging server(s) 118. FIG. 19 is described further below.

Figure 20A:
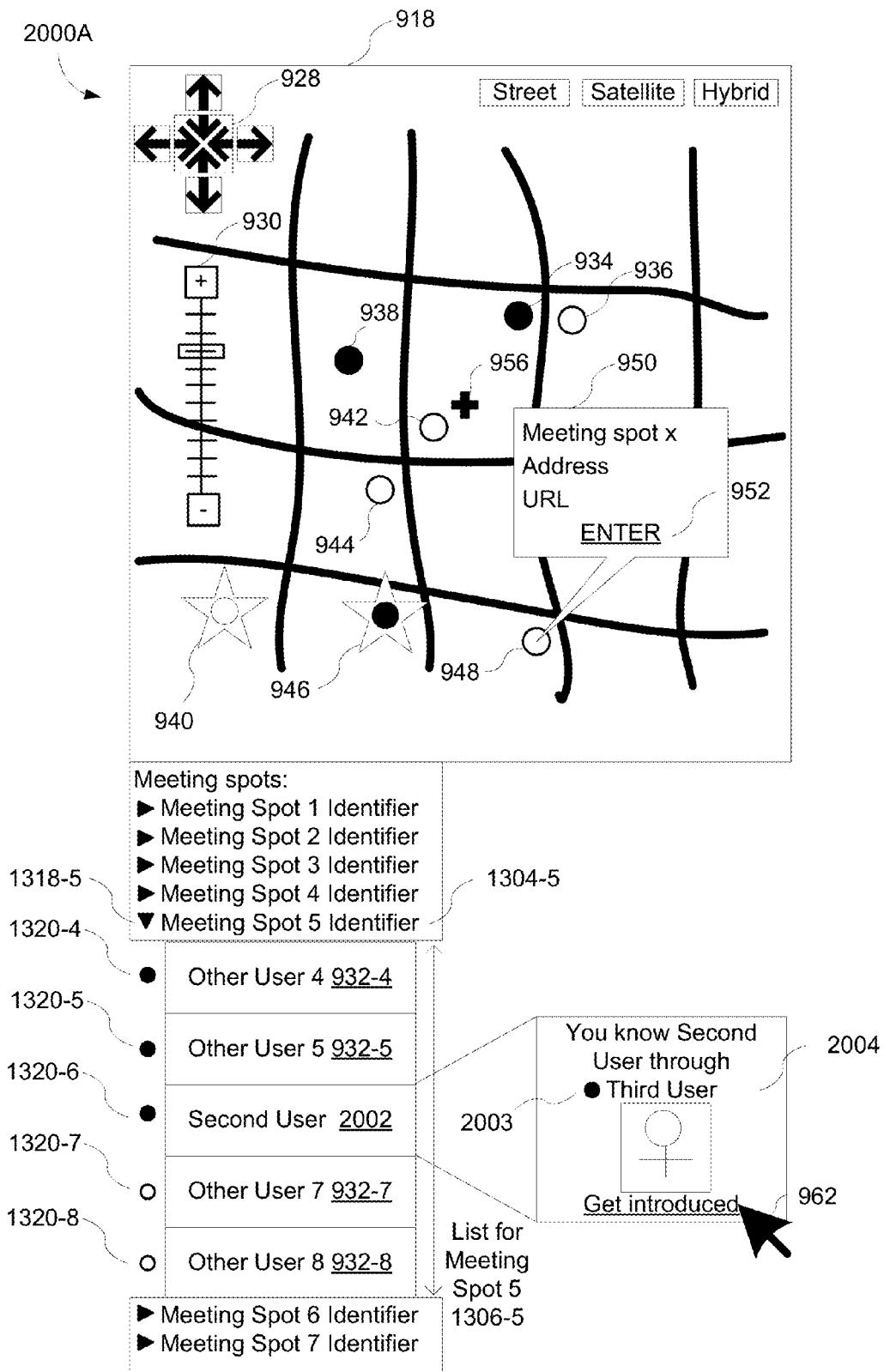
FIGS. 20A and 20B are schematic screen shots of exemplary graphical user interfaces for clients associated with a first user and a third user, respectively, for making a meeting-spot-related introduction in accordance with some embodiments.
Figure 20B:
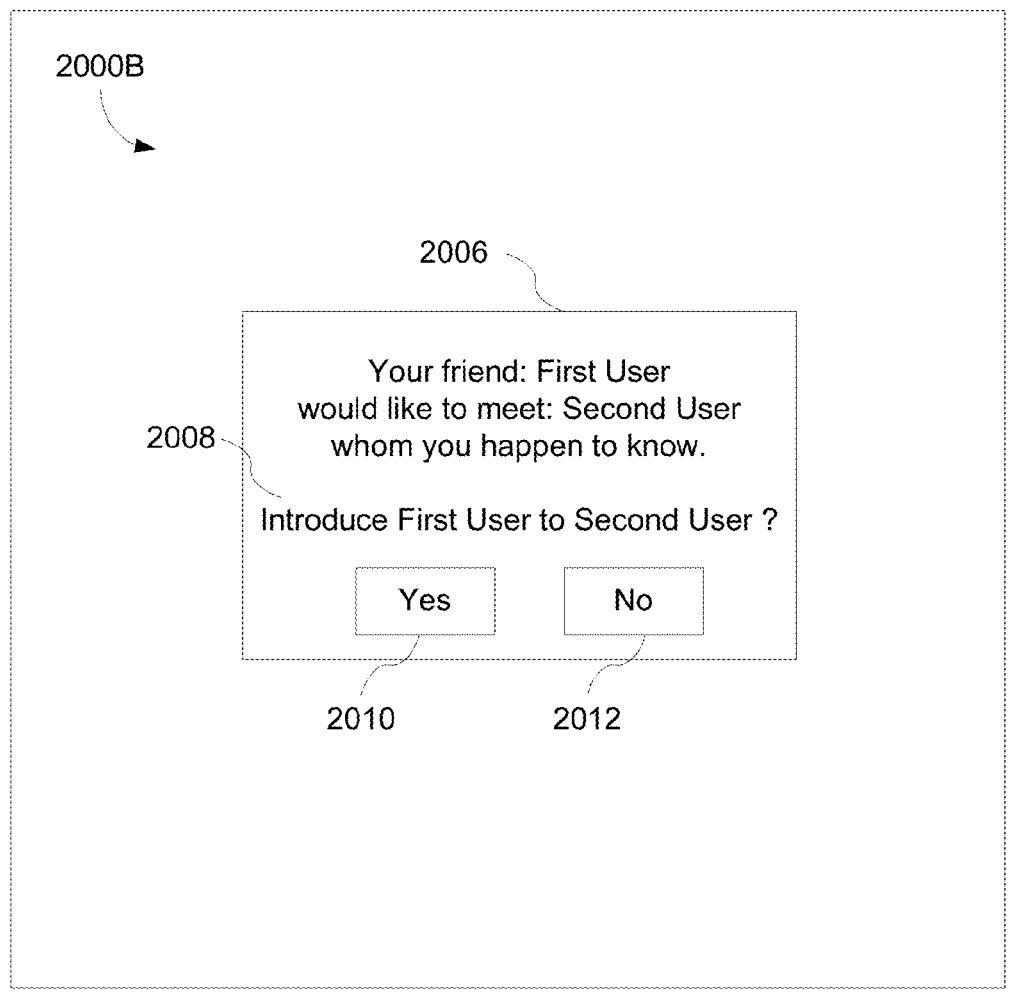

FIGS. 20A and 20B are schematic screen shots of exemplary graphical user interfaces 2000A and 2000B for clients associated with a first user and a third user, respectively, for making a meeting-spot-related introduction in accordance with some embodiments.

Graphical user interface 2000A on a client device associated with a first user (e.g., on client 104-1) includes: an identifier for a meeting spot (e.g., 1304-5) and/or an icon for a meeting spot (e.g., 934-948); information about a plurality of other users 932 that are associated with the meeting spot, including information about a second user 2002 associated with the meeting spot; and information about a third user 2004. In some embodiments, user interface 2000A includes online status information 1320 about the other users.

In some embodiments, the identifier 1304 is a name or logo for the meeting spot.

The third user is associated with the first user and is also associated with the second user. In some embodiments, the third user is associated with the first user by a reference to the third user in a record for the first user (e.g., the third user may be in the contact list 512 in the user database record 240 for the first user). Similarly, in some embodiments, the third user is associated with the second user by a reference to the third user in a record for the second user (e.g., the third user may be in the contact list 512 in the user database record 240 for the second user).

In response to receiving a selection of the second user from the first user (e.g., by detecting a click or hover by cursor 962 on the information for the second user 2002), the information about the third user 2004 is displayed.

In response to receiving from the first user a request to communicate with the third user (e.g., by detecting a click by cursor 962 on the "Get introduced" link in the information for the third user 2004), a communication is sent to a client device associated with the third user and the client device associated with the first user participates in an online communication with the client device associated with the third user and a client device associated with the second user.

The graphical user interface 2000A may contain a subset of the features or items shown in FIG. 20A. Furthermore, in some embodiments, the graphical user interface 2000A may include other features or items not shown in FIG. 20A.

Graphical user interface 2000B on a client device associated with a third user (e.g., on client 104-3) includes: an automatically generated online communication 2006 from a first user with a request 2008 to introduce the first user to a second user; a first icon (e.g., Yes icon 2010) that when activated by the third user initiates an online communication amongst the first user, the second user, and the third user; and a second icon (e.g., No icon 2012) that when activated by the third user declines the request by the first user for the third user to initiate an online communication amongst the first user, the second user, and the third user.

The graphical user interface 2000B may contain a subset of the features or items shown in FIG. 20B. Furthermore, in some embodiments, the graphical user interface 2000B may include other features or items not shown in FIG. 20B.

Referring to FIG. 19, server 102 associates (1902) a first user with a meeting spot. As described above, in some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon (e.g., one of icons 934-948) or an identifier 1304 corresponding to the meeting spot. In some embodiments, the icon or identifier corresponding to the meeting spot is displayed on a digital map (e.g., 918). In some embodiments, the icon or identifier corresponding to the meeting spot is displayed in a contact list (e.g., 1304-5, FIG. 20A).

Server 102 identifies (1904) a plurality of other users (i.e., users other than the first user) that are also associated with the meeting spot. As described above, in some embodiments, the plurality of other users are identified by respective identifiers for the meeting spot 402 in respective records 240 for the plurality of other users. For example, the meeting spot ID 402 may be included in the respective records 240 for the plurality of other users in the entered meeting spots 504 and/or the tagged meeting spots 506. In some embodiments, the plurality of other users are identified via the user IDs listed in field 418 of the meeting spot record 228.

Server 102 sends (1906) information about at least some of the plurality of other users to a client device associated with the first user (e.g., client 104-1, FIG. 1). This information may include online status information 1320 about the other users for whom information is sent to the client.

The client device associated with a first user (e.g., client 104-1, FIG. 1) receives (1908) from server 102 information about a plurality of other users associated with a meeting spot. In some embodiments, the first user is also associated with the meeting spot. As described above, client device 104-1 may be permanently associated with the first user (e.g., by a telephone number or IP address) or the client device 104-1 may be intermittently associated with the first user (e.g., by the user logging in and out of a communications application (e.g., 314, 316, or 318) on the client device 104-1).

Client 104-1 displays (1910) an icon (e.g., one of icons 934-948) and/or identifier for the meeting spot (e.g., 1304-5) and at least some of the information for the plurality of other users associated with the meeting spot (e.g., 932-4, 932-5, 2002, 932-7, and 932-8, FIG. 20A). In some embodiments, the icon and/or identifier for the meeting spot is displayed on a digital map (e.g., 918, FIG. 20A). In some embodiments, the icon and/or identifier for the meeting spot is displayed in a contact list (e.g., 1306-5, FIG. 20A). In some embodiments, the information displayed for the plurality of other users includes online status information 1320 for those other users.

Client 104-1 receives (1912) from the first user a selection of a second user in the plurality of other users. In some embodiments, receiving the selection of the second user from the first user comprises detecting activation of a link or icon corresponding to the second user (e.g., a hover or click by cursor 962 on the information about the second user 2002, FIG. 20A).

In some embodiments, client 104-1 sends (1914) information that corresponds to the selected second user to server 102.

Server 102 receives (1916) information that corresponds to the second user associated with the meeting spot from the client device associated with the first user.

Server 102 identifies (1918) a third user that is associated with the first user and is also associated with the second user. In some embodiments, identifying the third user comprises identifying a third user that is in a contact list of the first user and is also in a contact list of the second user. In some embodiments, if there are multiple users (who may be called mutual contacts) who are associated with both the first user and the second user, the third user is determined by the server in accordance with a metric that is based, at least in part, on the amount of communication between the second user and each of the mutual contacts. Alternately, or in addition, the third user may be determined by the server in accordance with a metric that is based, at least in part, on the amount of communication between the first user and each of the mutual contacts. Alternately, or in addition, the criteria used for determining the third user may favor users who are associated with a meeting spot that is also associated with both the first and second users. In some embodiments, more than one third user is determined. For example, the top N mutual contacts, where N is an integer (e.g., 1, 2, or 3), are determined and sent to the client 104-1, thereby giving the first user a choice of third users to make the introduction to the second user. Selection of a third user(s) in accordance with the aforementioned metric(s) or criteria may also be applicable to operations 2106 and/or 2126, described below.

In some embodiments, server 102 or 118 identifies (1920) an online status of the third user, as described above.

Server 102 sends (1922) information about the third user to the client device 104-1 associated with the first user. In some embodiments, the information about the third user includes online status information about the third user 2003.

Client 104-1 receives (1924) from server 102 information about the third user.

Client 104-1 displays (1926) at least some of the information about the third user 2004.

Client 104-1 receives (1928) from the first user a request to communicate with the third user. In some embodiments, receiving from the first user a request to communicate with the third user comprises detecting activation of a link in the information about the third user that initiates communication to a client associated with the third user (e.g., detecting a click on the "Get introduced" link in FIG. 20A).

Client 104-1 sends (1930) a communication to a client device 104-3 associated with the third user. In some embodiments, the communication to a client associated with the third user is an online communication if the third user is online. In some embodiments, the communication to a client associated with the third user is an email message if the third user is offline. In some embodiments, the communication 2006 that is sent to the client device associated with the third user includes a request 2008 for the third user to introduce the first user to the second user. In some embodiments, the request is generated without human intervention (e.g., a standard message asking the third user to contact the second user to make an introduction or asking the third user to initiate an online communication among the first user, second user, and third user).

Client 104-1 participates (1932) in an online communication with the client device 104-3 associated with the third user and a client device 104-2 associated with the second user.

Figure 21:
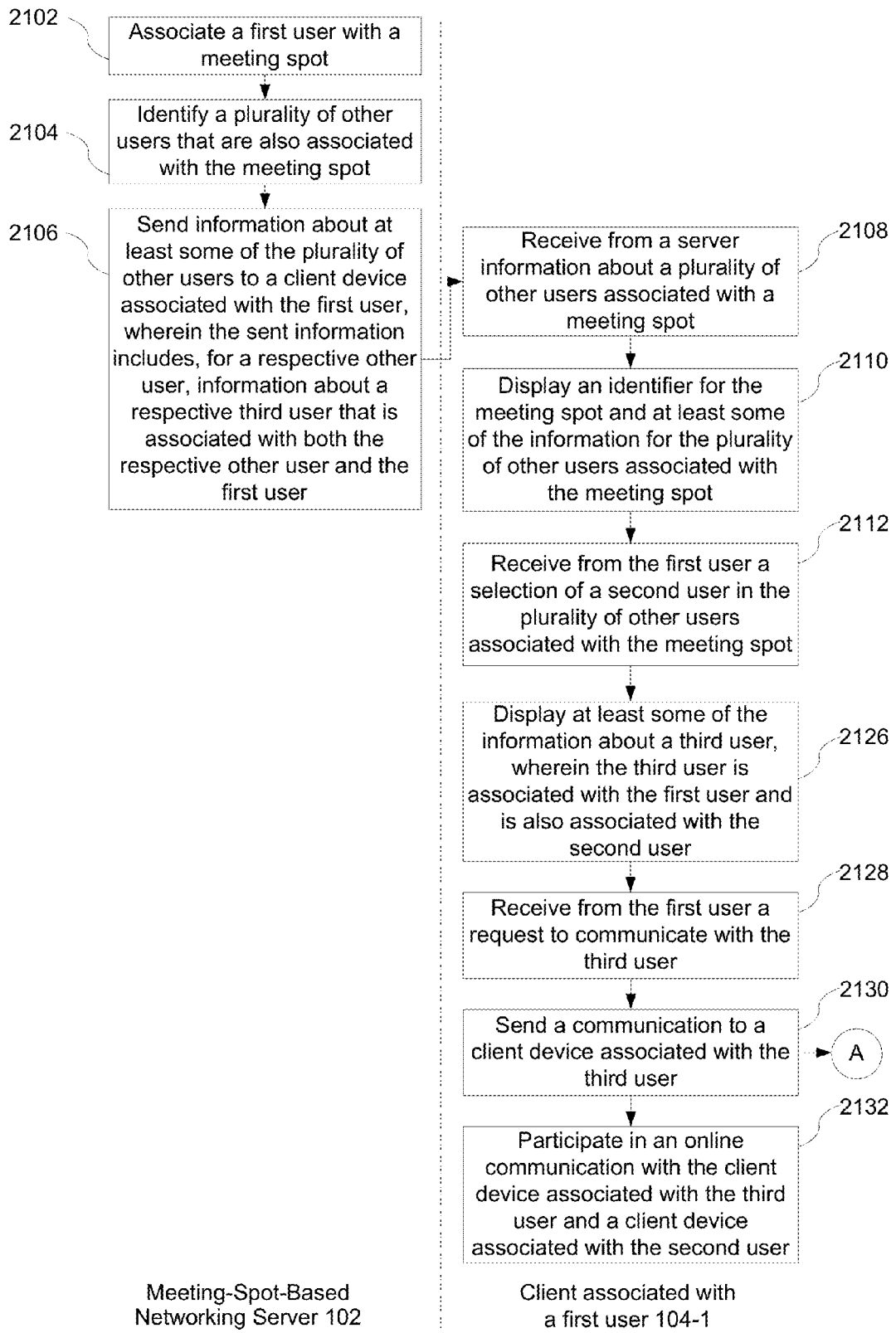
FIG. 21 is a flowchart representing a method of making an introduction via meeting-spot-related online communications in accordance with some embodiments.

FIG. 21 is a flowchart representing a method, performed by server 102 (e.g., with mapping engine 220) and client 104-1, of making an introduction via meeting-spot-related online communications in accordance with some embodiments. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104 or by messaging server(s) 118.

Server 102 associates (2102) a first user with a meeting spot. As described above, in some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon (e.g., one of icons 934-948) or an identifier 1304 corresponding to the meeting spot. In some embodiments, the icon or identifier corresponding to the meeting spot is displayed on a digital map (e.g., 918). In some embodiments, the icon or identifier corresponding to the meeting spot is displayed in a contact list (e.g., 1304-5, FIG. 20A).

Server 102 identifies (2104) a plurality of other users (i.e., users other than the first user) that are also associated with the meeting spot. As described above, in some embodiments, the plurality of other users are identified by respective identifiers for the meeting spot 402 in respective records 240 for the plurality of other users. For example, the meeting spot ID 402 may be included in the respective records 240 for the plurality of other users in the entered meeting spots 504 and/or the tagged meeting spots 506. In some embodiments, the plurality of other users are identified via the user IDs listed in field 418 of the meeting spot record 228.

Server 102 sends (2106) information about at least some of the plurality of other users to a client device associated with the first user (e.g., client 104-1, FIG. 1). The sent information includes, for a respective other user, information about a respective third user that is associated with both the respective other user and the first user (e.g., a third user that is in both a contact list for the respective other user and a contact list for the first user). In some embodiments, the information about the other users includes online status information about the other users.

The client device associated with a first user (e.g., client 104-1, FIG. 1) receives (2108) from server 102 information about a plurality of other users associated with a meeting spot. In some embodiments, the first user is also associated with the meeting spot. As described above, client device 104-1 may be permanently associated with the first user (e.g., by a telephone number or IP address) or the client device 104-1 may be intermittently associated with the first user (e.g., by the user logging in and out of a communications application (e.g., 314, 316, or 318) on the client device 104-1).

Client 104-1 displays (2110) an icon (e.g., one of icons 934-948) and/or identifier for the meeting spot (e.g., 1304-5) and at least some of the information for the plurality of other users associated with the meeting spot (e.g., 932-4, 932-5, 2002, 932-7, and 932-8, FIG. 20A). In some embodiments, the icon and/or identifier for the meeting spot is displayed on a digital map (e.g., 918, FIG. 20A). In some embodiments, the icon and/or identifier for the meeting spot is displayed in a contact list (e.g., 1306-5, FIG. 20A).

Client 104-1 receives (2112) from the first user a selection of a second user in the plurality of other users. In some embodiments, receiving the selection of the second user from the first user comprises detecting activation of a link or icon corresponding to the second user (e.g., a hover or click by cursor 962 on the information about the second user 2002, FIG. 20A).

Client 104-1 displays (2126) information about a third user 2004. The third user is associated with the first user and is also associated with the second user (e.g., the third user is in both a contact list for the first user and a contact list for the second user).

Client 104-1 receives (2128) from the first user a request to communicate with the third user. In some embodiments, receiving from the first user a request to communicate with the third user comprises detecting activation of a link in the information about the third user that initiates communication to a client associated with the third user (e.g., detecting a click on the "Get introduced" link in FIG. 20A).

Client 104-1 sends (2130) a communication to a client device 104-3 associated with the third user. In some embodiments, the communication to a client associated with the third user is an online communication if the third user is online. In some embodiments, the communication to a client associated with the third user is an email message if the third user is offline. In some embodiments, the communication 2006 that is sent to the client device associated with the third user includes a request 2008 for the third user to introduce the first user to the second user. In some embodiments, the request is generated without human intervention (e.g., a standard message asking the third user to contact the second user to make an introduction or asking the third user to initiate an online communication among the first user, second user, and third user).

Client 104-1 participates (2132) in an online communication with the client device 104-3 associated with the third user and a client device 104-2 associated with the second user.

Figure 22:
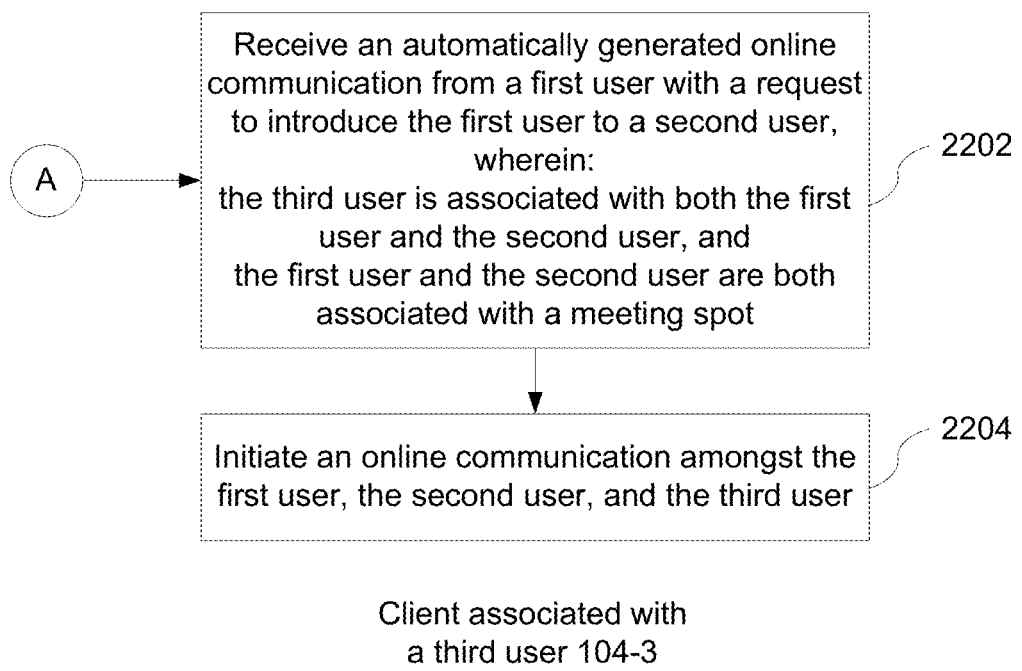
FIG. 22 is a flowchart representing a method performed by a client device associated with a third user of making an introduction via meeting-spot-related online communications in accordance with some embodiments.

FIG. 22 is a flowchart representing a method performed by a client device associated with a third user (e.g., client 104-3, FIG. 1) of making an introduction via meeting-spot-related online communications in accordance with some embodiments. It will be appreciated by those of ordinary skill in the art that one or more of the acts described may be performed by hardware, software, or a combination thereof, as may be embodied in one or more computing systems.

Client 104-3 receives (2202) an automatically generated online communication 2006 from a first user with a request 2008 to introduce the first user to a second user (e.g., an online communication sent 1930/2130 by client 104-1). The third user is associated with both the first user and the second user (e.g., the third user is in both a contact list for the first user and a contact list for the second user). The first user and the second user are both associated with a meeting spot. As described above, in some embodiments, the first user is associated with the meeting spot by a reference to the meeting spot in a record for the first user in server 102. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. Similarly, the second user may be associated with the meeting spot by a reference to the meeting spot in a record for the second user in server 102. In some embodiments, the third user is also associated with the meeting spot (e.g., by a reference to the meeting spot in a record for the third user in server 102). In other embodiments, the third user is not associated with the meeting spot.

Client 104-3 initiates (2204) an online communication amongst the first user, the second user, and the third user. For example, upon detecting activation of the Yes icon 2010, client 104-3 initiates an online chat session, audio chat, VoIP conference, or video chat.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a server computer, comprising a processor and memory:
associating a first user, who is currently online and active, with a first physical location of a first plurality of physical locations by determining that a client device associated with the first user is within a predetermined physical distance or an estimated driving time of the first physical location;
identifying a plurality of other users, who are currently online and active, that have currently selected the first physical location as one of a respective second plurality of physical locations;
sending information about at least some of the plurality of other users to a client device associated with the first user, wherein the information includes an identity of a second user in the plurality of other users, and wherein the second user has selected the first physical location using a graphical user interface that includes the first physical location and that is displayed on a client device associated with the second user;
receiving, from the client device associated with the first user, a selection of the second user from the plurality of other users, wherein the selection of the second user from the plurality of other users is based at least in part on a number of common physical locations between the first plurality of physical locations and the respective second plurality of physical locations, wherein the number is at least two and includes the first physical location;
identifying, responsive to the selection of the second user, a third user who is online and active, wherein the third user is associated with the first user and wherein the third user is associated with the second user;
sending information about the third user to the client device associated with the first user to provide an indication to the first user that the first user may be introduced to the second user through the third user; and
facilitating online communication between the client device associated with the first user, the client device associated with the second user, and a client device associated with the third user responsive to a request from the client device associated with the first user to the client device associated with the third user to be introduced by the third user to the second user, while the second user has still selected the first physical location.

2. The method of claim 1, wherein the third user is in a contact list of the first user and is also in a contact list of the second user.

3. The method of claim 1, including identifying an online status of the third user.

4. The method of claim 1, wherein the information further includes online status information about the third user.

5. The method of claim 1, wherein the first physical location is a restaurant, bar, club, library, gym, bookstore, park, or store.

6. The method of claim 1, wherein the second user has selected the first physical location by selection of a predefined region of a map within the graphical user interface that includes the first physical location.

7. The method of claim 1, further comprising determining that the client device associated with the first user is within the predetermined physical distance or the estimated driving time of the first physical location using a GPS ability of the client device associated with the first user.

8. A computer-implemented method, comprising:
at a server computer, comprising a processor and memory:
determining that a client device associated with a first user is within a predetermined physical distance or an estimated driving time of a first physical location of a first plurality of physical locations;
identifying a plurality of other users, who are currently online and active, that have currently selected the first physical location as one of a respective second plurality of physical locations; and
sending information about at least some of the plurality of other users to the client device associated with a first user, wherein the information includes an identity of a second user in the plurality of other users, and wherein the second user has selected the first physical location using a graphical user interface that includes the first physical location and that is displayed on a client device associated with the second user;
wherein the client device associated with the first user:
receives from the first user a selection of the second user from the plurality of other users, wherein the selection of the second user from the plurality of other users is based at least in part on a number of common physical locations between the first plurality of physical locations and the respective second plurality of physical locations, wherein the number is at least two and includes the first physical location;
responsive to receiving the selection of the second user, displays information about a third user who is currently online and active, wherein the third user is associated with the first user and wherein the third user is associated with the second user;
receives from the first user a request to communicate with the third user;
sends a communication to a client device associated with the third user to be introduced by the third user to the second user; and
participates in an online communication with the client device associated with the third user and the client device associated with the second user while the second user has still selected the first physical location, when permitted by the client device associated with the third user.

9. The method of claim 8, wherein the first user is associated with the first physical location by a reference to the first physical location in a record for the first user.

10. The method of claim 9, wherein the reference to the first physical location is added to the record for the first user when the first user activates an icon corresponding to the first physical location and wherein the identifying and sending occurs when the first user is associated with the first physical location.

11. The method of claim 10, wherein the icon corresponding to the first physical location is displayed on a digital geographic map.

12. The method of claim 10, wherein the icon corresponding to the first physical location is displayed in a contact list.

13. The method of claim 8, wherein the information about the other users includes online status information about the other users.

14. A computer-implemented method, comprising:
at a client device associated with a first user, the client device associated with the first user comprising a processor and memory:
  determining that the client device is within a predetermined physical distance or an estimated driving time of a first physical location of a first plurality of physical locations;
  receiving a selection of a second user in a plurality of other users that are online and active and have selected the first physical location as one of a respective second plurality of physical locations, wherein:
    the selection of the second user from the plurality of other users is based at least in part on a number of common physical locations between the first plurality of physical locations and the respective second plurality of physical locations, wherein the number is at least two and includes the first physical location;
    the first physical location represented by an identifier on the display of the client device associated with the first user; and
    the second user has selected the first physical location using a graphical user interface that includes the first physical location and that is displayed on a client device associated with the second user;
  displaying, responsive to receiving the selection of the second user, information about a third user associated with the first user and also associated with the second user, wherein, and wherein the third user is online and active and has currently selected the same first physical location;
  receiving from the first user a request to be introduced by the third user to the second user;
  sending a communication to a client device associated with the third user; and
  participating in an online communication with the client device associated with the third user and the client device associated with the second user.

15. The method of claim 14, wherein the identifier for the first physical location is displayed on a digital geographic map.

16. The method of claim 14, wherein the identifier for the first physical location is displayed in a contact list.

17. The method of claim 14, wherein receiving the selection of the second user from the first user comprises detecting activation of a link or icon corresponding to the second user.

18. The method of claim 14, including:
sending information that corresponds to the selected second user to a server computer; and
receiving from the server computer information about the third user.

19. A graphical user interface on a client device associated with a first user who is currently online and active, the client device associated with the first user comprising a processor and memory, the graphical user interface comprising:
  an icon and/or an identifier for a first physical location of a first plurality of physical locations when it is determined that the client device associated with the first user is within a predetermined physical distance or an estimated driving time of the first physical location of the first plurality of physical locations;
  information about a plurality of other users, who are currently online and active, that have currently selected the first physical location as one of a respective second plurality of physical locations, wherein the information about the plurality of other users includes information about a second user associated with the first physical location, wherein the second user has selected the first physical location using a graphical user interface that includes the first physical location and that is displayed on a client device associated with the second user; and
  information about a third user who is currently online and active;
wherein:
  the third user is associated with the first user and is also associated with the second user;
  in response to receiving a selection of the second user from the plurality of other users by the first user, the information about the third user is displayed, wherein the selection of the second user from the plurality of other users is based at least in part on a number of common physical locations between the first plurality of physical locations and the respective second plurality of physical locations, wherein the number is at least two and includes the first physical location; and
  in response to receiving from the first user a request to communicate with the third user, a request is sent to a client device associated with the third user to be introduced by the third user to the second user while the second user while the second user has currently selected the first physical location, and
  the client device associated with the first user participates in an online communication with the client device associated with the third user and the client device associated with the second user when permitted by the client device associated with the third user.

20. The graphical user interface of claim 19, wherein the identifier is a name or logo for the first physical location.

* * * * *

UNITED STATES PATENT AND TRADEMARK OFFICE
CERTIFICATE OF CORRECTION

PATENT NO. : 10,139,996 B2
APPLICATION NO. : 14/305421
DATED : November 27, 2018
INVENTOR(S) : Karam Page 1 of 1

It is certified that error appears in the above-identified patent and that said Letters Patent is hereby corrected as shown below:

In the Claims

Claim 14, Column 35, Line 30, please delete "wherein, and wherein the" and insert --wherein, the--;

Claim 19, Column 36, Line 41, please delete "user while the second user has" and insert --user has--.

Signed and Sealed this
Fifth Day of March, 2019

Andrei Iancu
*Director of the United States Patent and Trademark Office*